(12) United States Patent
Hiraiwa et al.

(10) Patent No.: US 11,198,409 B2
(45) Date of Patent: Dec. 14, 2021

(54) PASSENGER SEAT AIRBAG DEVICE

(71) Applicant: TOYODA GOSEI CO., LTD., Kiyosu (JP)

(72) Inventors: Takuya Hiraiwa, Kiyosu (JP); Shinichi Ishida, Kiyosu (JP); Koji Hosoe, Kiyosu (JP); Masashi Baba, Kiyosu (JP); Ryo Kumazaki, Kiyosu (JP); Hiromi Kondo, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/923,171

(22) Filed: Jul. 8, 2020

(65) Prior Publication Data

US 2021/0031716 A1 Feb. 4, 2021

(30) Foreign Application Priority Data

Jul. 30, 2019 (JP) .............................. JP2019-140317

(51) Int. Cl.
*B60R 21/205* (2011.01)
*B60R 21/231* (2011.01)
*B60R 21/2338* (2011.01)
*B60R 21/237* (2006.01)
(Continued)

(52) U.S. Cl.
CPC .......... *B60R 21/205* (2013.01); *B60R 21/235* (2013.01); *B60R 21/237* (2013.01); *B60R 21/231* (2013.01); *B60R 2021/0004* (2013.01); *B60R 2021/0009* (2013.01); *B60R 2021/0048* (2013.01); *B60R 2021/23382* (2013.01); *B60R 2021/23509* (2013.01)

(58) Field of Classification Search
CPC . B60R 21/205; B60R 21/2338; B60R 21/231; B60R 2021/0009; B60R 2021/0048; B60R 2021/0004; B60R 2021/23382
USPC .............................................. 280/732, 743.2
See application file for complete search history.

(56) References Cited

U.S. PATENT DOCUMENTS

| | | | |
|---|---|---|---|
| 2016/0046254 A1 | 2/2016 | Yamada et al. | |
| 2016/0046257 A1* | 2/2016 | Yamada | ............... B60R 21/2338 280/729 |
| 2016/0207490 A1* | 7/2016 | Yamada | ................ B60R 21/235 |

(Continued)

FOREIGN PATENT DOCUMENTS

| | | |
|---|---|---|
| JP | 2016-040160 A | 3/2016 |
| JP | 2017-065394 A | 4/2017 |
| JP | 2018-202951 A | 12/2018 |

*Primary Examiner* — Keith J Frisby
(74) *Attorney, Agent, or Firm* — Posz Law Group, PLC

(57) ABSTRACT

A passenger seat airbag device includes an airbag including a front collision restraining surface, and an oblique collision restraining portion including a protruding portion in which a surface is set as an oblique collision restraining surface, and a restraining recess portion whose facing surfaces are able to restrain the head of the occupant. The rear wall main portion has the front collision restraining surface. The rear wall end edge portion has the oblique collision restraining surface. The upper edge of the rear wall end edge portion is coupled to a rear edge of the upper wall portion. The lower edge of the rear wall end edge portion is coupled to a rear edge of the lower wall portion. An entire edge of the separation edge of the rear wall end edge portion is coupled to a rear edge of the rear edge side portion.

5 Claims, 19 Drawing Sheets

(51) Int. Cl.
  *B60R 21/235*  (2006.01)
  *B60R 21/00*  (2006.01)

(56) References Cited

U.S. PATENT DOCUMENTS

| | | |
|---|---|---|
| 2017/0088080 A1 | 3/2017 | Hotta et al. |
| 2017/0355346 A1* | 12/2017 | Kobayashi .......... B60R 21/0136 |
| 2018/0056922 A1* | 3/2018 | Yamada ................ B60R 21/235 |
| 2018/0345901 A1 | 12/2018 | Yamada et al. |
| 2018/0354450 A1* | 12/2018 | Yamada ................ B60R 21/239 |
| 2019/0283702 A1* | 9/2019 | Yamada .............. B60R 21/2338 |
| 2020/0010044 A1* | 1/2020 | Yamada .............. B60R 21/2338 |
| 2020/0156583 A1* | 5/2020 | Yamada ................ B60R 21/205 |

\* cited by examiner

FIG. 13A
FIG. 13B
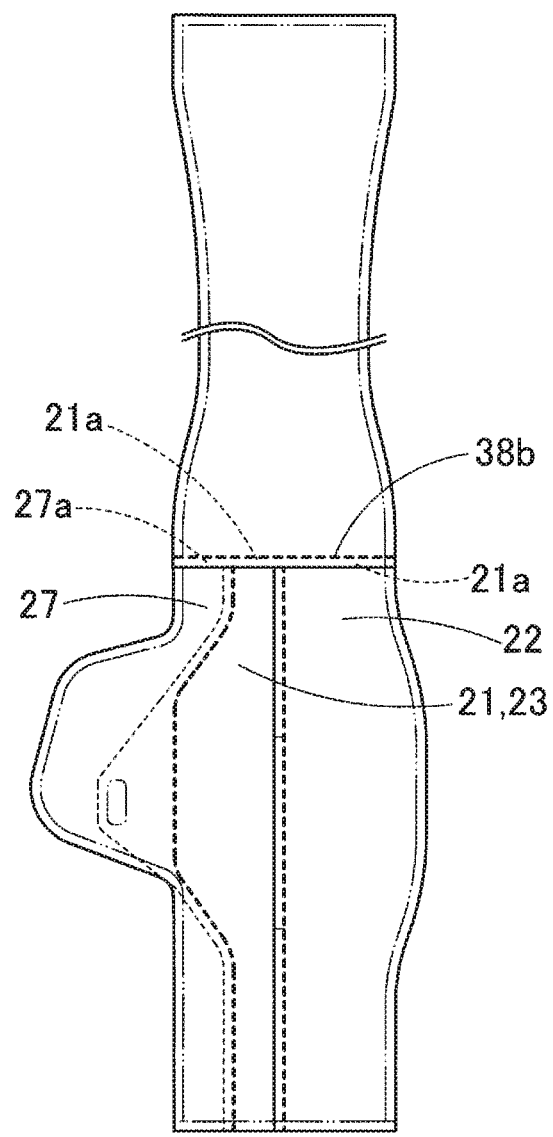
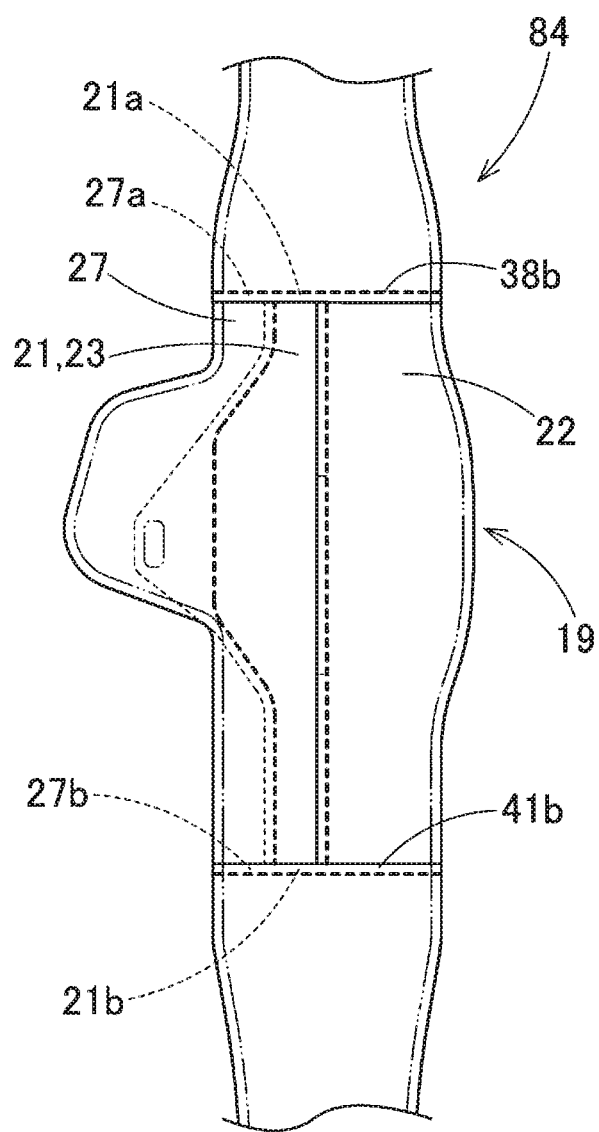

PASSENGER SEAT AIRBAG DEVICE

CROSS-REFERENCE TO RELATED APPLICATIONS

This application is based upon and claims the benefit of priority from prior Japanese patent application No. 2019-140317, filed on Jul. 30, 2019, the entire contents of which are incorporated herein by reference.

TECHNICAL FIELD

The present invention relates to a passenger seat airbag device including an airbag which is folded and stored at a storage portion disposed in an instrument panel on a front side of an occupant seated in a passenger seat, and which is deployed and inflated to be able to protect the occupant by protruding from the storage portion to a vehicle rear side when an inflation gas flows in.

BACKGROUND ART

In the related art, a passenger seat airbag device is configured such that an airbag includes, as an outer peripheral wall after inflation is completed, a rear wall portion on a rear side; an upper wall portion extending forward from an upper edge side of the rear wall portion; a lower wall portion which extends forward from a lower edge side of the rear wall portion, whose front edge side is connected to a front edge side of the upper wall portion, and in which a vicinity of a center in a left-right direction on a front portion side is set as an attachment portion for attaching the airbag to a storage portion while allowing an inflation gas to flow inside; and left wall portion and right wall portion which extend forward respectively from left and right edges of the rear wall portion and whose upper and lower edges are connected to the upper wall portion and the lower wall portion (refer to, for example, JP-A-2018-202951). Further, the airbag includes, on a rear wall portion side after the inflation is completed, a front collision restraining surface for receiving a head of an occupant that moves forward in a front collision of a vehicle, and an oblique collision restraining portion for receiving a head of an occupant that moves obliquely forward in an oblique collision or an offset collision of a vehicle. The oblique collision restraining portion includes a protruding portion which protrudes rearward from a left-right direction edge side of the front collision restraining surface, for example, an edge side at the center of the vehicle in a vehicle width direction, and in which a surface on a front collision restraining surface side is set as an oblique collision restraining surface for receiving a head of an occupant that moves obliquely forward; and a restraining recess portion which is disposed on a front collision restraining surface side of the protruding portion, which extends forward from adjacent edges of the oblique collision restraining surface and the front collision restraining surface, and whose facing surfaces can restrain a head of an occupant.

However, in the passenger seat airbag device in the related art, since the airbag is provided with the protruding portion which protrudes rearward at the center of the vehicle in the vehicle width direction and the restraining recess portion which are recessed forward, it is inevitable that a length dimension of a substantial film length in the left-right direction, including the protrusion and recess, is increased, and a width dimension in the left-right direction (vehicle width direction) after the inflation is completed is increased, so that there is a problem in keeping a width dimension of the airbag in the left-right direction small when the oblique collision restraining portion which smoothly receives a head of an occupant that moves obliquely is provided.

An object of the present invention is to provide a passenger seat airbag device, which is capable of preventing an increase in width dimension of an airbag in the left-right direction after inflation is completed even when an airbag includes an oblique collision restraining portion.

SUMMARY OF INVENTION

According to an aspect of the invention, there is provided a passenger seat airbag device comprising: an airbag which is folded and stored at a storage portion disposed in an instrument panel on a front side of an occupant seated in a passenger seat, and which is deployed and inflated to be able to protect the occupant by protruding from the storage portion to a vehicle rear side when an inflation gas flows in, the airbag including: as an outer peripheral wall when the inflation is completed, a rear wall portion on a rear portion side; an upper wall portion extending forward from an upper edge side of the rear wall portion; a lower wall portion which extends forward from a lower edge side of the rear wall portion, and in which a vicinity of a center in a left-right direction on a front portion side thereof is set as an attachment portion for attaching the airbag to the storage portion while allowing the inflation gas to flow inside; and a left wall portion and a right wall portion which extend forward respectively from left and right edges of the rear wall portion and whose upper and lower edges are connected to the upper wall portion and the lower wall portion, and the airbag further including, on a rear wall portion side when the inflation is completed: a front collision restraining surface configured to receive a head of the occupant that moves forward in a front collision of a vehicle; and an oblique collision restraining portion configured to receive the head of the occupant that moves obliquely forward in an oblique collision or offset collision of the vehicle, and the oblique collision restraining portion including: a protruding portion which protrudes rearward from a left-right direction edge side of the front collision restraining surface, and in which a surface on a front collision restraining surface side is set as an oblique collision restraining surface configured to receive the head of the occupant that moves obliquely forward; and a restraining recess portion which is disposed on the front collision restraining surface side of the protruding portion, which extends forward from adjacent edges of the oblique collision restraining surface and the front collision restraining surface, and whose facing surfaces are able to restrain the head of the occupant, wherein the rear wall portion of the airbag includes a rear wall main portion and a rear wall end edge portion on the oblique collision restraining portion side, which are separated to the left and right with the restraining recess portion interposed therebetween, the rear wall main portion has a configuration in which the front collision restraining surface is disposed, the rear wall end edge portion has a configuration in Which the oblique collision restraining surface is disposed, a surface of the protruding portion of the airbag which is on an opposite side of the oblique collision restraining surface is formed from a rear edge side portion in a protruding side lateral wall portion constituting the left wall portion or the right wall portion on a side where the protruding portion is disposed, the oblique collision restraining surface is formed from the rear wall end edge portion, the restraining recess portion of the airbag is formed by connecting a peripheral edge of an end edge-side extending portion extending forward from an inner edge of the rear wall end edge portion on a rear wall main portion side, and a peripheral edge of a main portion-side extending portion extending forward from an edge of the rear wall main portion on a rear wall end edge portion side, the rear wall end edge portion is formed from a sheet-shaped bag base fabric for forming the rear wall end edge portion, and the bag base fabric has an outer peripheral edge including: an upper edge on an upper wall portion side; a lower edge on a lower wall portion side; a separation edge which is an edge on a side away from the front collision restraining surface between the upper edge and the lower edge, and which is shaped to bulge away from an edge on the front collision restraining surface side; and an inner edge on the front collision restraining surface side between the upper edge and the lower edge, the upper edge of the rear wall end edge portion is continuous with an upper edge of the rear wall main portion in the left-right direction, and is coupled to a rear edge of the upper wall portion, the lower edge of the rear wall end edge portion is continuous with a lower edge of the rear wall main portion in the left-right direction, and is coupled to a rear edge of the lower wall portion, an entire edge of the separation edge of the rear wall end edge portion is coupled to a rear edge of the rear edge side portion of the protruding side lateral wall portion, and the inner edge of the rear wall end edge portion includes a middle portion which is an edge portion of the end edge-side extending portion to be coupled to the main portion-side extending portion, and upper and lower portions of the middle portion are coupled to corresponding edge portions of the rear wall main portion on the rear wall end edge portion side such that the rear wall end edge portion and the rear wall main portion are continuous in the left-right direction.

BRIEF DESCRIPTION OF DRAWINGS

FIGS. 13A and 13B illustrate manufacturing steps of the airbag according to the embodiment, and the steps are subsequent to those in FIG. 12.

DESCRIPTION OF EMBODIMENTS

Figure 1:
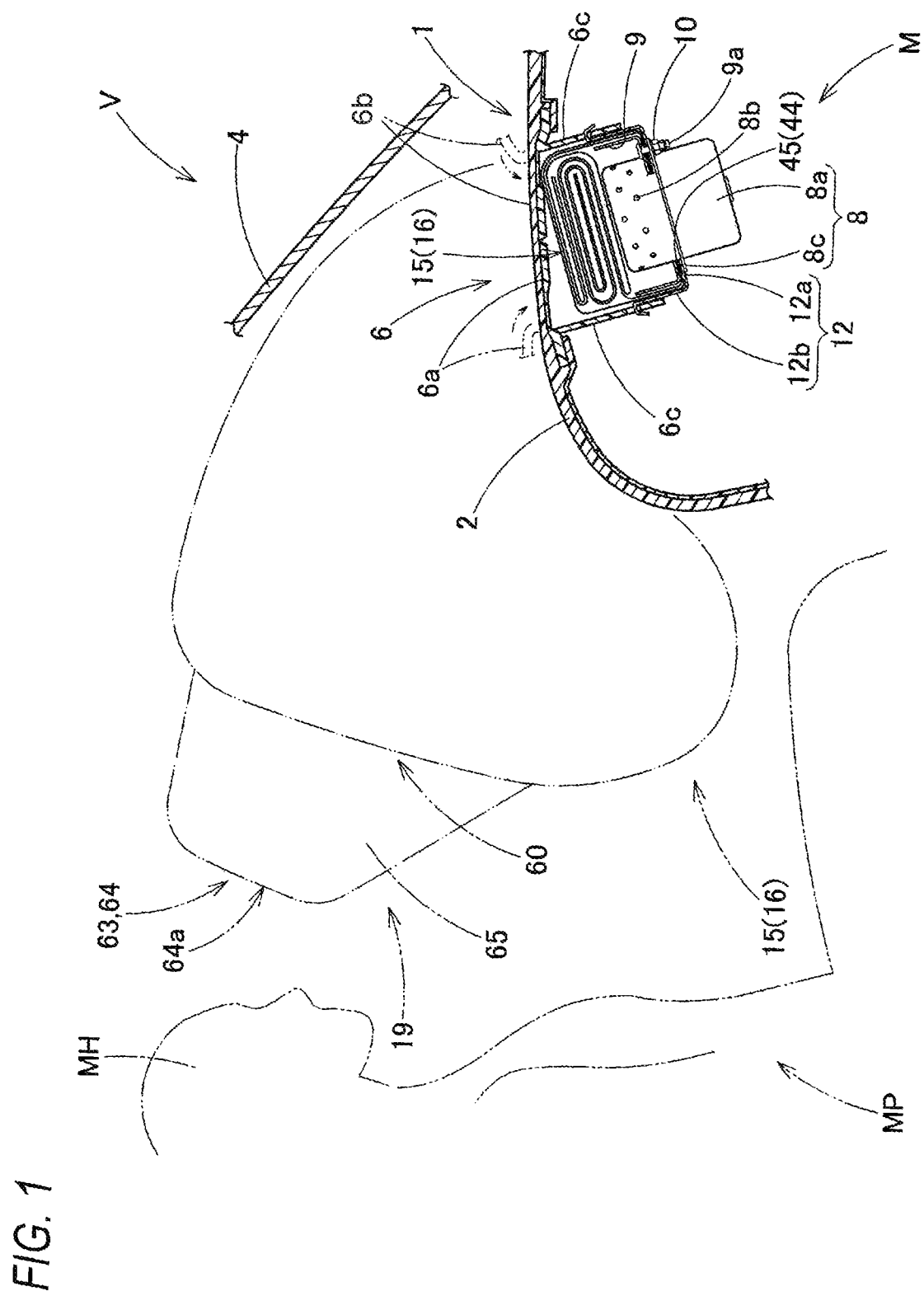
FIG. 1 is a schematic longitudinal sectional view showing a state in which a passenger seat airbag device according to an embodiment of the present invention is mounted on a vehicle.
Figure 2:
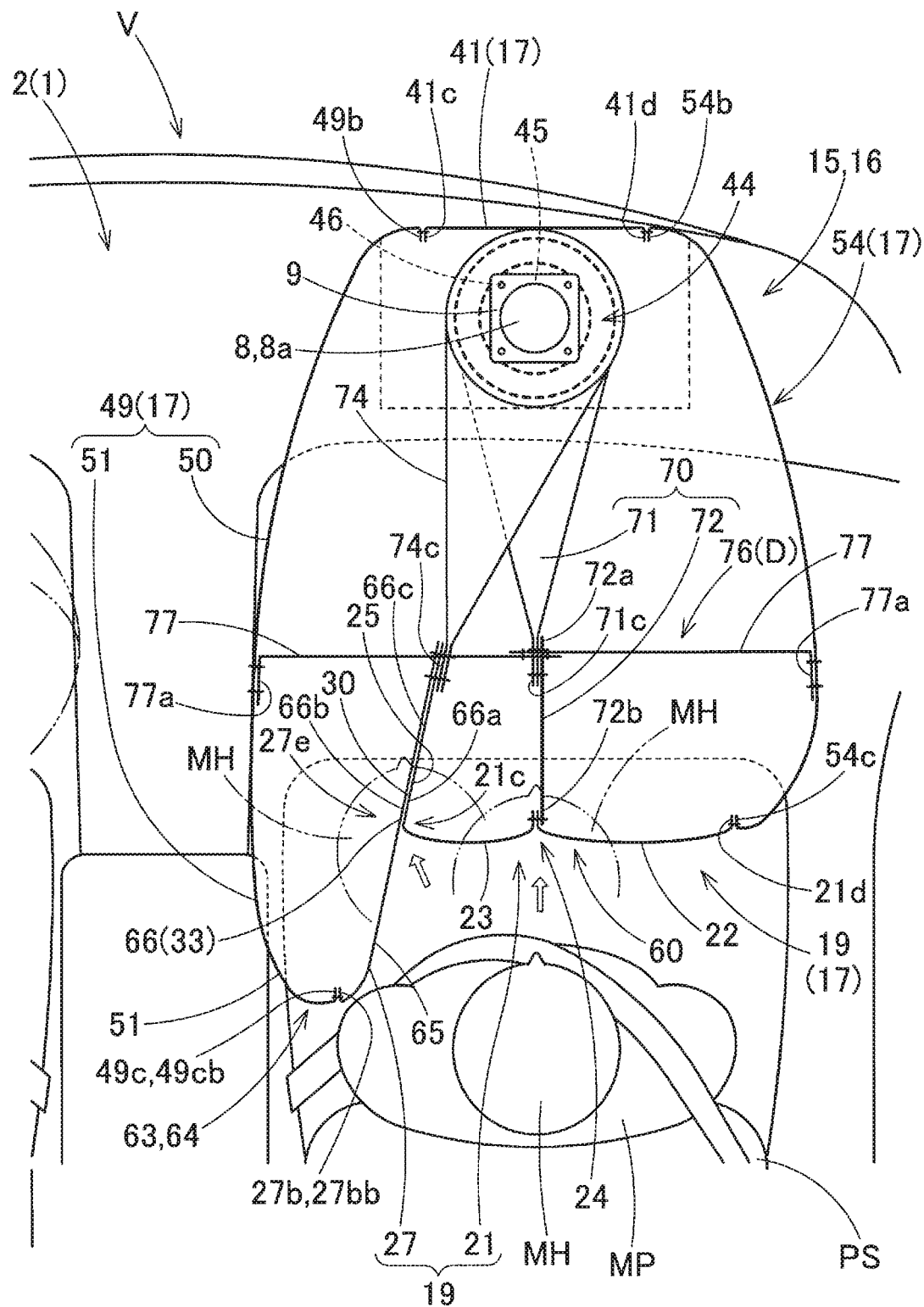
FIG. 2 is a schematic transverse sectional view when the passenger seat airbag device according to the embodiment is operated in a state of being mounted in a vehicle.
Figure 3:
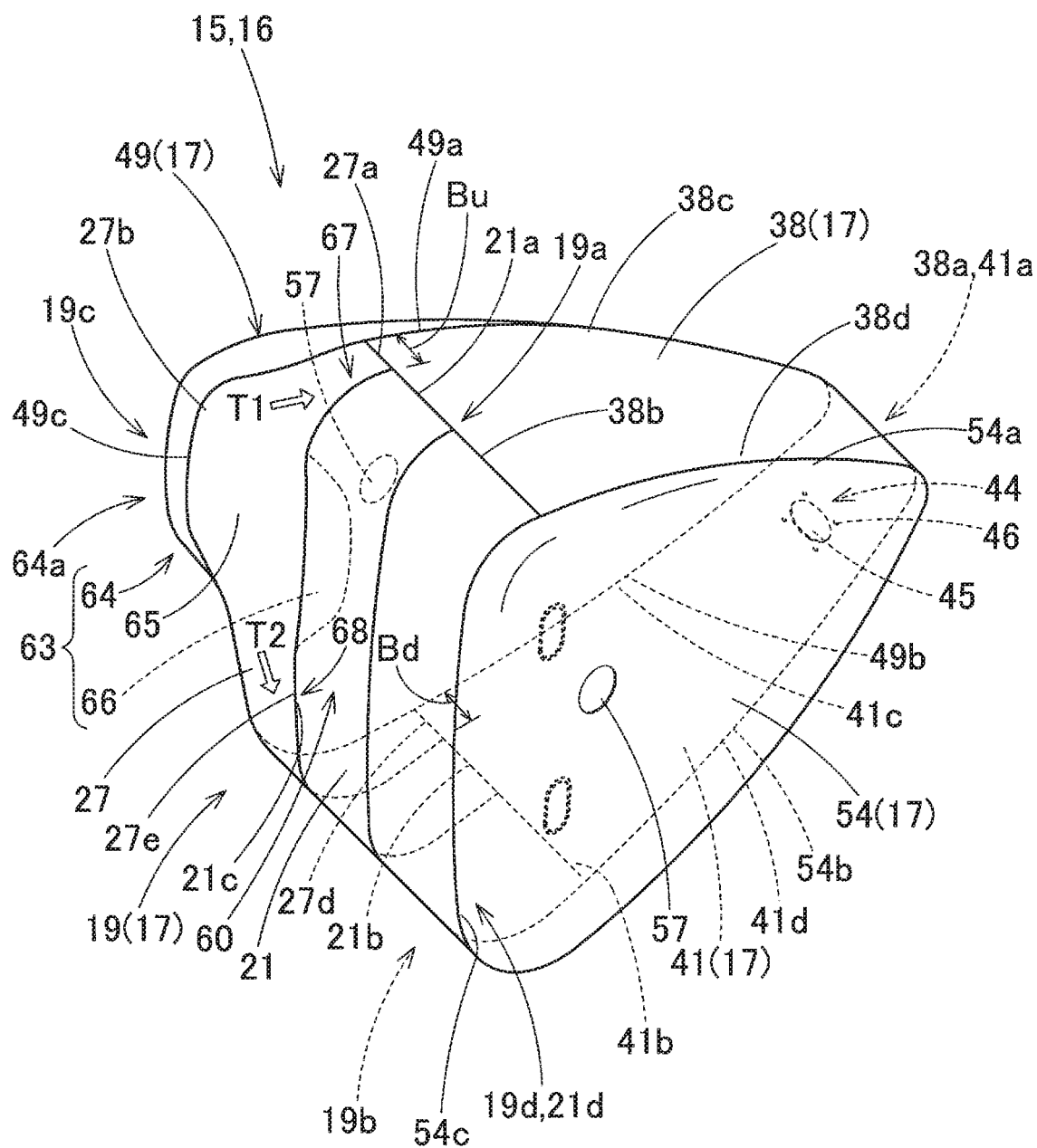
FIG. 3 is a perspective view showing a state in which an airbag used in the passenger seat airbag device of the embodiment is inflated alone as viewed obliquely from rear right.
Figure 4:
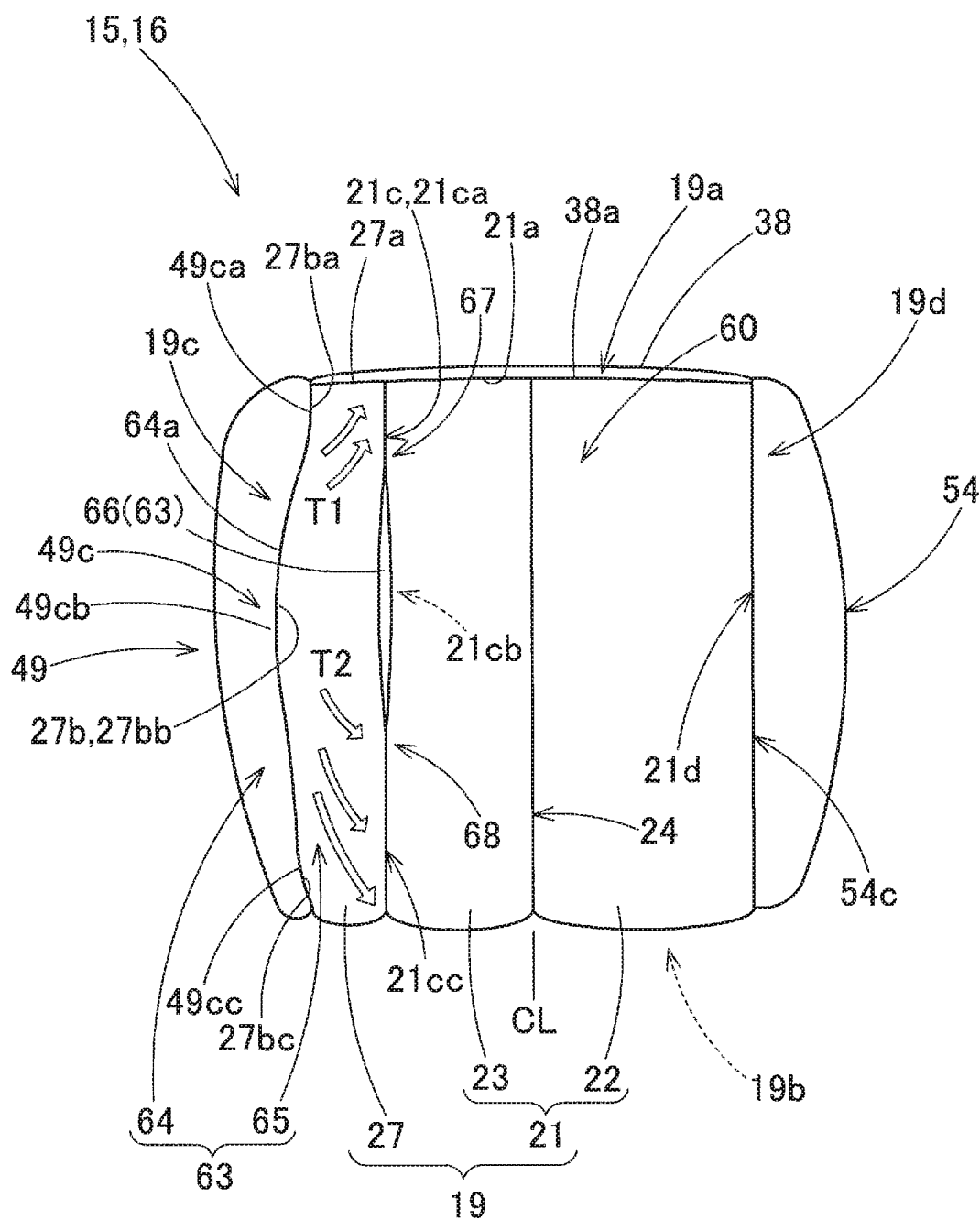
FIG. 4 is a schematic front view of the airbag shown in FIG. 3.
Figure 5:
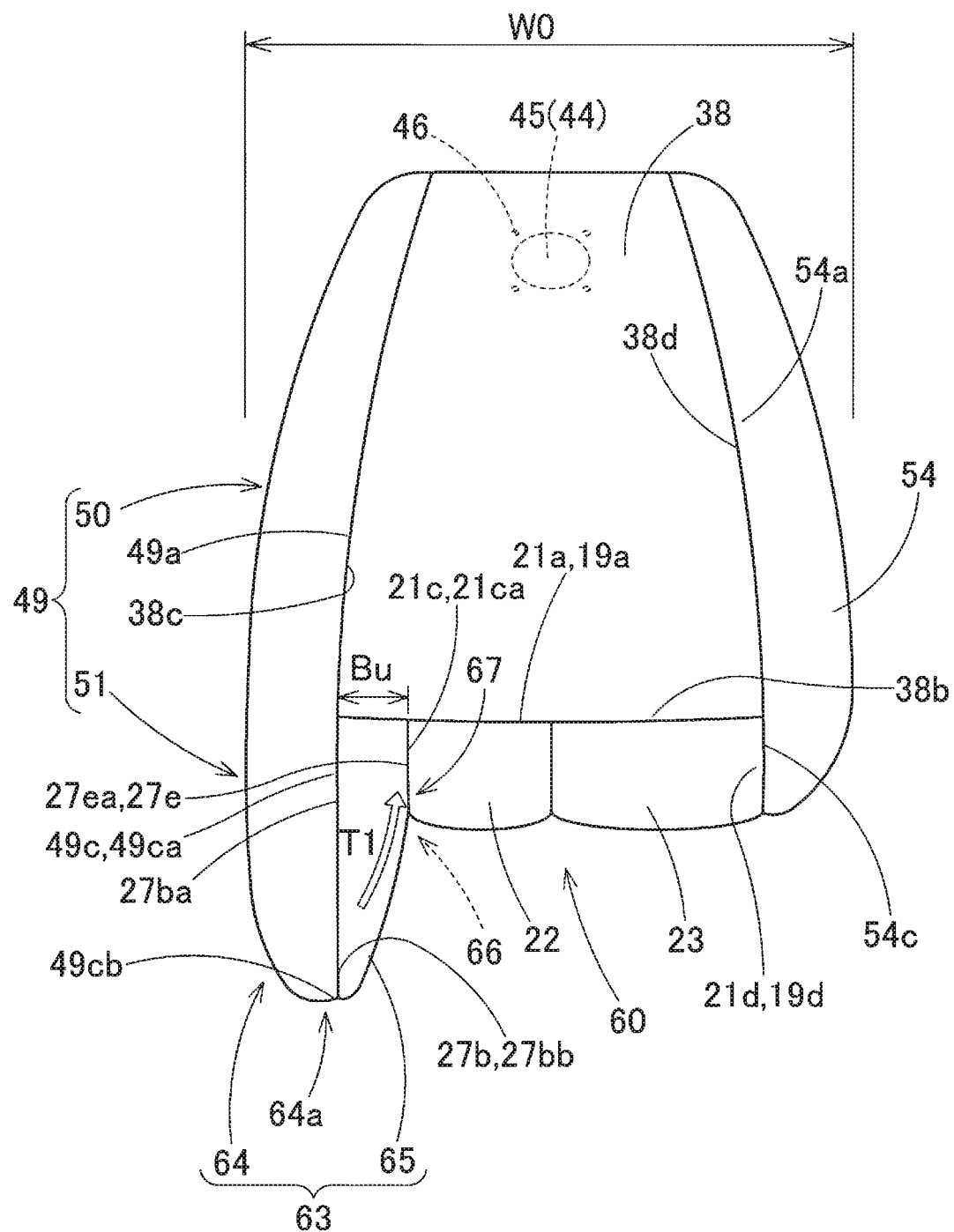
FIG. 5 is a schematic plan view of the airbag shown in FIG. 3.
Figure 6:
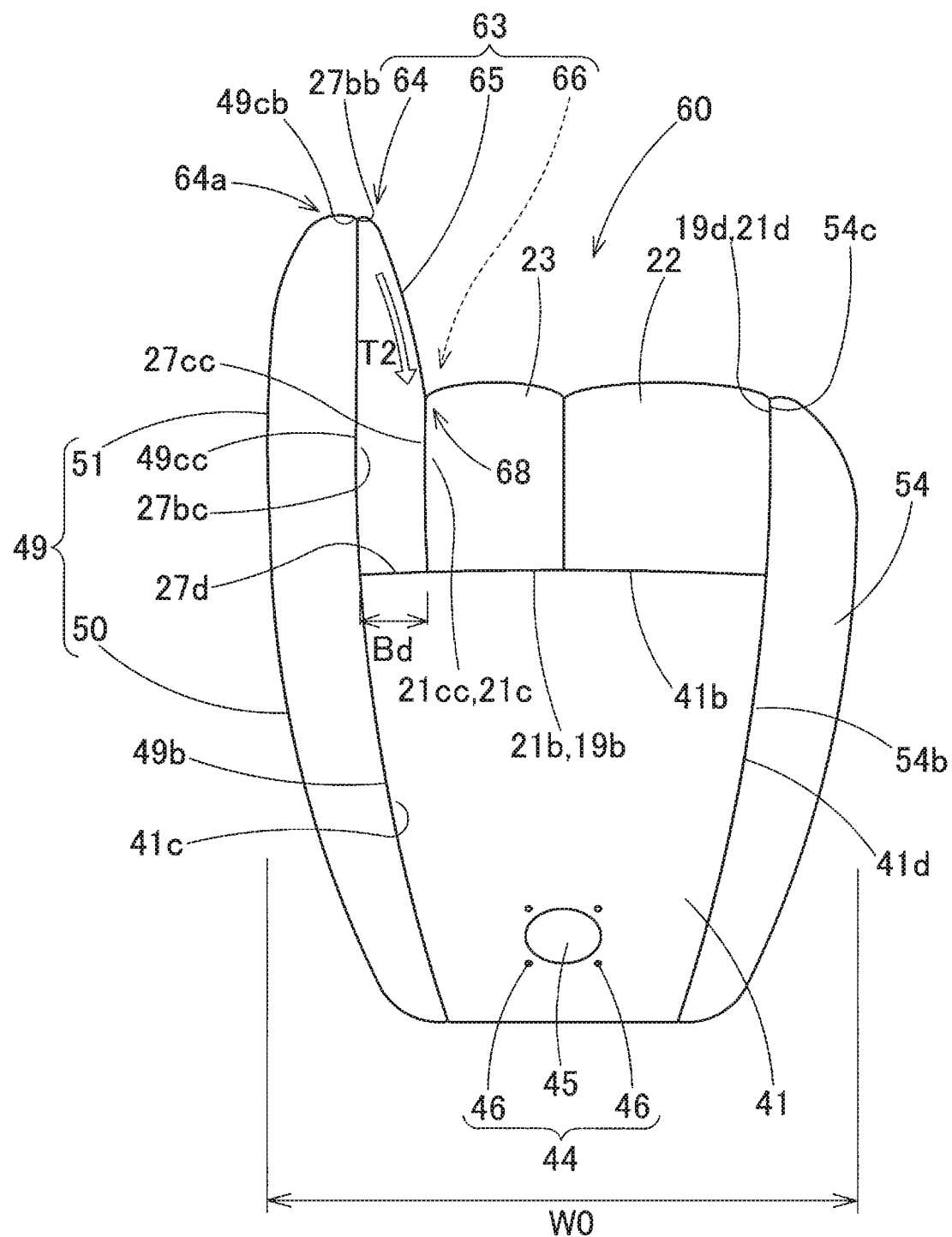
FIG. 6 is a schematic bottom view of the airbag shown in FIG. 3.

Hereinafter, an embodiment of the present invention will be described with reference to the drawings, and as shown in FIGS. 1 and 2, a passenger seat airbag device M of the embodiment is of top mount type that is disposed inside an upper surface 2 of an instrument panel (hereinafter simply referred to as "instrument panel") 1 in front of a passenger seat PS in a vehicle V. In the embodiment, front, rear, upper, lower, left, and right directions are the same as front, rear, upper, lower, left, and right directions of the vehicle V, unless otherwise specified.

As shown in FIG. 1, the passenger seat airbag device M of the embodiment includes a folded airbag 15, an inflator 8 for supplying an inflation gas to the airbag 15, a case 12 serving as a storage portion for storing and holding the airbag 15 and the inflator 8, a retainer 9 for attaching the airbag 15 and the inflator 8 to the case 12, and an airbag cover 6 covering an upper side of the folded airbag 15.

The airbag cover 6 is formed integrally with the instrument panel 1 made of synthetic resin, and is configured such that two front and rear doors 6a, 6b are pushed by the airbag 15 and are opened back and forth when the airbag 15 is deployed and inflated. A connecting wall portion 6c connected to the case 12 is formed around the doors 6a, 6b of the airbag cover 6.

The inflator 8 includes a substantially cylindrical main portion 8a having a plurality of gas discharge ports 8b, and a flange portion 8c for attaching the inflator 8 to the case 12. In the embodiment, the inflator 8 is configured to operate in a front collision, an oblique collision, and an offset collision of the vehicle V.

The case 12 serving as the storage portion is formed in a substantially rectangular parallelepiped shape which has a rectangular opening on an upper end side thereof and which is made of sheet metal, and the case 12 includes a substantially rectangular bottom wall portion 12a to which the inflator 8 is inserted from below, and a peripheral wall portion 12b which extends upward from an outer peripheral edge of the bottom wall portion 12a and to which the connecting wall portion 6c of the airbag cover 6 is locked. The airbag 15 and the inflator 8 are connected to the bottom wall portion 12a of the case 12 by fixing respective bolts 9a, as mounting means, of the retainer 9 arranged in the airbag 15 to nuts 10, passing through an attachment portion 44 where a gas flow inlet 45 of the airbag 15 is provided, the bottom wall portion 12a of the case 12, and the flange portion 8c of the inflator 8. A bracket (not shown) connected to a body side of the vehicle V is disposed on the bottom wall portion 12a of the case 12.

As shown in FIGS. 2 to 8, the airbag 15 includes a bag body 16 which is inflated when an inflation gas flows into an interior thereof, tethers 70, 74, 76 which are disposed in the bag body 16, and regulate an inflation completion shape of the bag body 16, and a flow regulating cloth 78 for regulating flow of the inflation gas flowing into the bag body 16.

The bag body 16 includes, as an outer peripheral wall 17 when the inflation is completed, a rear wall portion 19 on a rear side; an upper wall portion 38 extending forward from an upper edge 19a side of the rear wall portion 19; a lower wall portion 41 which extends forward from a lower edge 19b side of the rear wall portion 19, and whose front edge 41a side is connected to a front edge 38a of the upper wall portion 38; and left wall portion 49 and right wall portion 54 which extend forward respectively from a left edge 19c and a right edge 19d of the rear wall portion 19 and whose upper and lower edges 49a, 49b, and 54a, 54b are connected to the upper wall portion 38 and the lower wall portion 41.

The lower wall portion 41 includes an attachment portion 44 to be attached to the case 12 serving as the storage portion, in a vicinity of a center in the left-right direction on a front end side. In the attachment portion 44, the gas flow inlet 45 through which the inflation gas flows is provided, and attachment holes 46 through which the respective bolts 9a of the retainer 9 pass are provided on a peripheral edge of the gas flow inlet 45. Further, the left wall portion 49 and the right wall portion 54 are each opened with a vent hole 57 for discharging an excess inflation gas.

Then, in the bag body 16 of the airbag 15, a front collision restraining surface 60 for receiving a head MH of an occupant MP that moves forward in a front collision of the vehicle V and an oblique collision restraining portion 63 for receiving the head MH of the occupant MP that moves obliquely forward in an oblique collision or offset collision of the vehicle V are disposed on a rear wall portion 19 side when the inflation is completed.

The oblique collision restraining portion 63 is disposed on a left wall portion 49 side of the rear wall portion 19, and includes a protruding portion 64 which protrudes rearward than the front collision restraining surface 60 and a restraining recess portion 66 on a front collision restraining surface 60 side of the protruding portion 64. A surface of the protruding portion 64 on the front collision restraining surface 60 side is set as an oblique collision restraining surface 65 for receiving the head MH of the occupant MP that moves obliquely forward. The restraining recess portion 66 is disposed on the front collision restraining surface 60 side of the protruding portion 64 and extends forward from adjacent edges between the oblique collision restraining surface 65 and the front collision restraining surface 60, so as to be able to control and restrain rotation of the head MH such that the head MH of the occupant MP is sandwiched between facing surfaces 66a, 66b which face each other.

The rear wall portion 19 of the bag body 16 in the airbag 15 itself includes a rear wall main portion 21 and a rear wall end edge portion 27 on the oblique collision restraining portion 63 side which are separated to the left and right with the restraining recess portion 66 interposed therebetween. The rear wall main portion 21 has a configuration in which the front collision restraining surface 60 is disposed, and the rear wall end edge portion 27 has a configuration in which the oblique collision restraining surface 65 is disposed.

A surface of the protruding portion 64 of the oblique collision restraining portion 63 on an opposite side of the oblique collision restraining surface 65 is formed from a rear edge side portion 51 of the left wall portion 49 on a side where the protruding portion 64 is disposed. If both the left wall portion 49 and the right wall portion 54 are left and right lateral wall portions, the left wall portion 49 is a protruding side lateral wall portion on the side where the protruding portion 64 is disposed, and the right wall portion 54 is an opposite side lateral wall portion on an opposite side of the left wall portion 49, that is a side where the protruding portion 64 is not disposed. Further, in the embodiment, the protruding side lateral wall portion 49 includes the rear edge side portion 51 and a side wall main portion 50 on a front side of the rear edge side portion 51, and the upper edge 49a of the side wall main portion 50 is coupled to a left edge 38c of the upper wall portion 38 and the lower edge 49b is coupled to a left edge 41c of the lower wall portion 41.

The restraining recess portion 66 of the oblique collision restraining portion 63 disposed on the rear wall portion 19 is formed by connecting a peripheral edge of an end edge-side extending portion 30 extending forward from an inner edge 27e of the rear wall end edge portion 27 on a rear wall main portion 21 side, and a peripheral edge of a main portion-side extending portion 25 extending forward from an edge 21c of the rear wall main portion 21 on a rear wall end edge portion 27 side.

Figure 9:
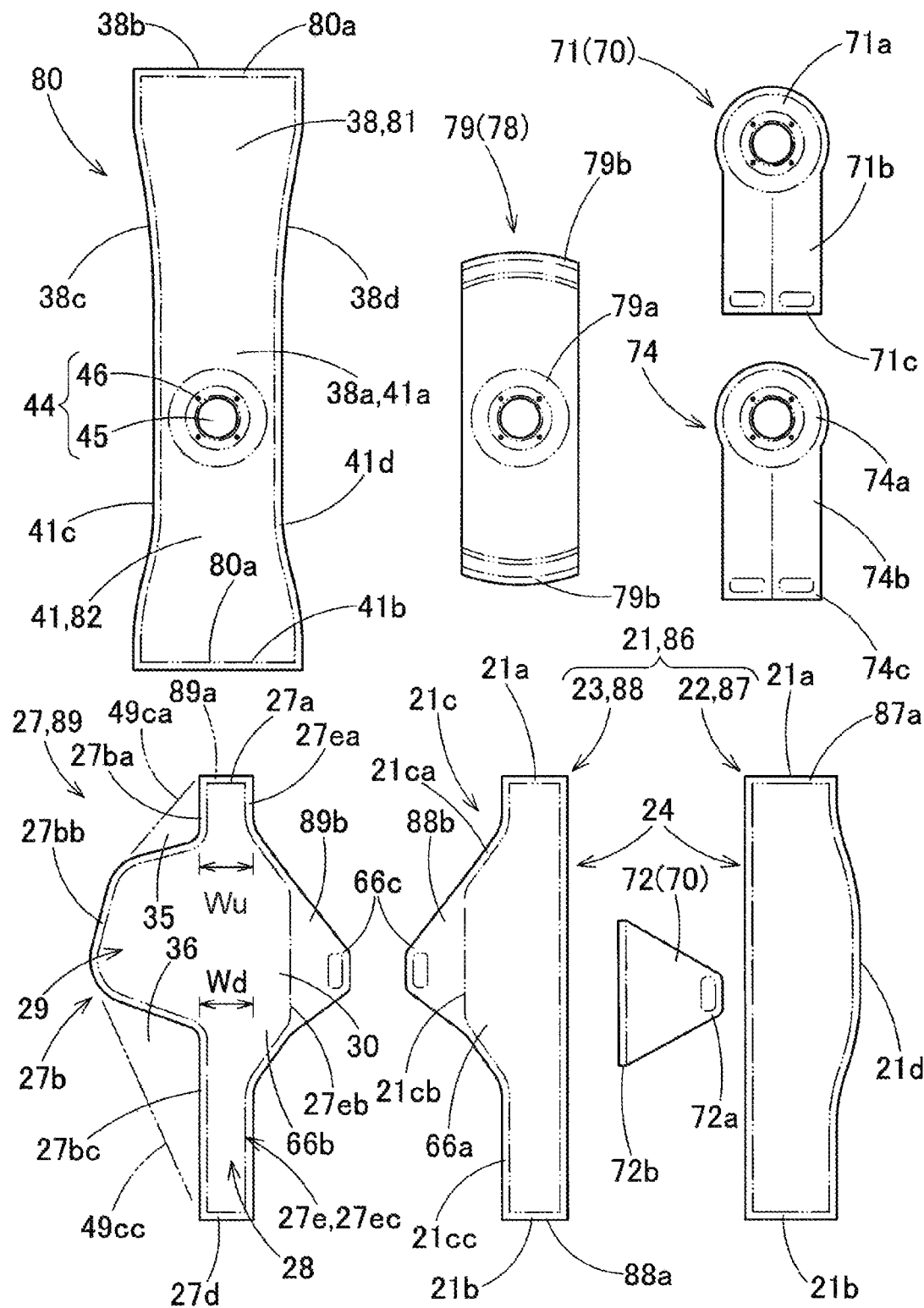
FIG. 9 is a plan view showing base fabrics configuring the airbag according to the embodiment.

Further, as shown in FIG. 9, the rear wall end edge portion 27 is formed from one sheet-shaped rear wall end edge portion forming bag base fabric (end edge base fabric) 89 made of a woven fabric such as polyimide, and an outer peripheral edge of the end edge base fabric 89 includes an upper edge 27a on an upper wall portion 38 side; a lower edge 27d on a lower wall portion 41 side; a separation edge 27b that is an edge on a side away from the front collision restraining surface 60 between the upper edge 27a and the lower edge 27d, and is shaped to bulge away from an edge on the front collision restraining surface 60 side; and the inner edge 27e on the front collision restraining surface 60 side between the upper edge 27a and the lower edge 27d.

Further, in the rear wall end edge portion 27, the upper edge 27a is continuous with the upper edge 21a of the rear wall main portion 21 in the left-right direction and is coupled to a rear edge 38b of the upper wall portion 38. The lower edge 27d of the rear wall end edge portion 27 is continuous with a lower edge 21b of the rear wall main portion 21 in the left-right direction, and is coupled to a rear edge 41b of the lower wall portion 41, and the entire edge of the separation edge 27b of the rear wall end edge portion 27 is coupled to a rear edge 49c side of the rear edge side portion 51 of the protruding side lateral wall portion 49.

Further, the inner edge 27e of the rear wall end edge portion 27 includes a middle portion 27eb which is an edge portion of the end edge-side extending portion 30 to be coupled to a middle portion 21cb of the end edge 21c of the main portion-side extending portion 25, and an upper portion 27ea and a lower portion 27ec of the middle portion 27eb are coupled to corresponding edge portions of the rear wall main portion 21 on the rear wall end edge portion 27 side (an upper portion 21ca and a lower portion 21cc on an end edge 21c side) such that the rear wall end edge portion 27 and the rear wall main portion 21 are continuous in a plane in the left-right direction.

Figure 10:
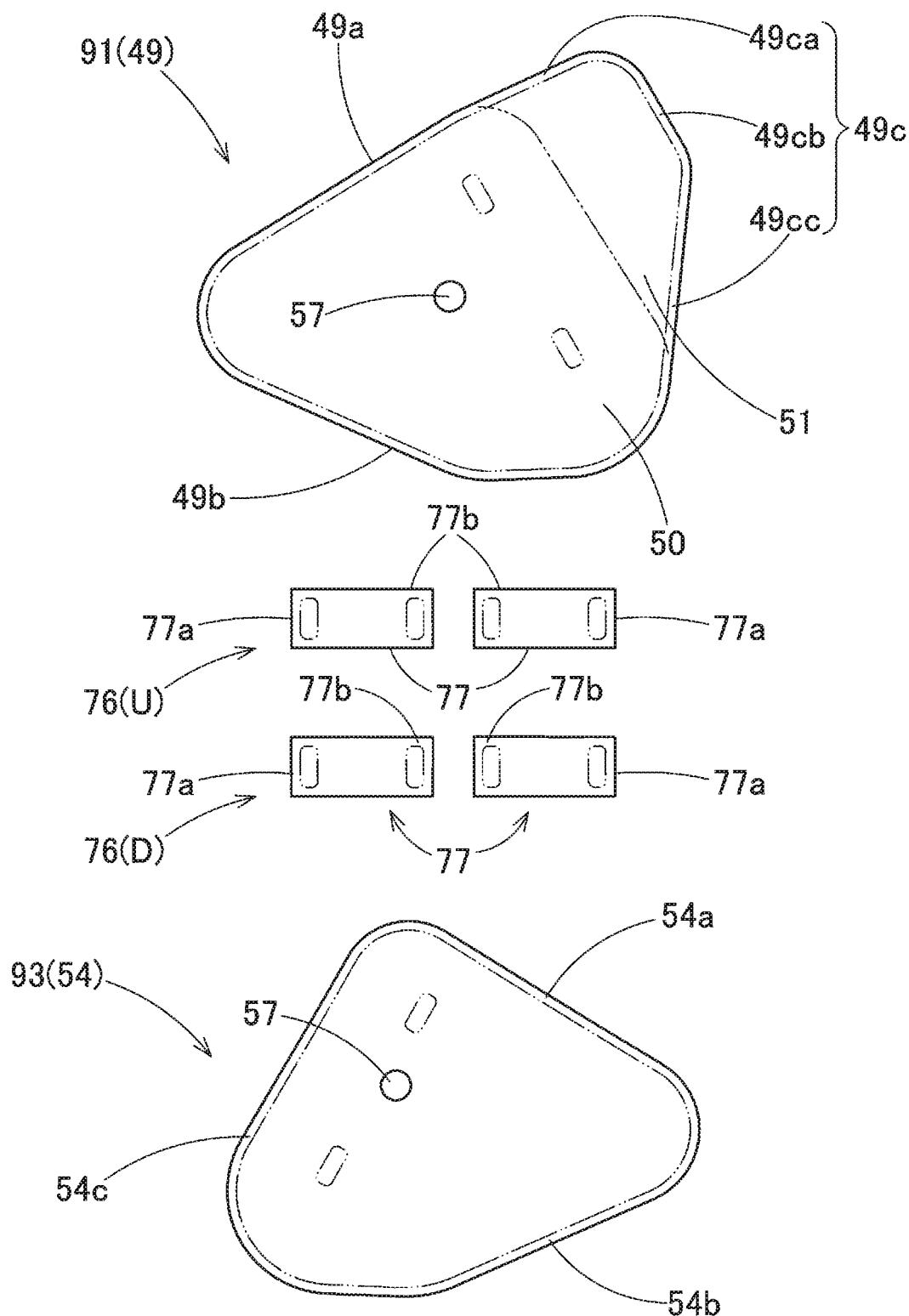
FIG. 10 is a plan view showing rest base fabrics configuring the airbag according to the embodiment.

The protruding side lateral wall portion 49 coupled to the separation edge 27b is formed from a left wall portion forming bag base fabric (left wall portion base fabric) 91 made of a woven fabric such as polyamide, as shown in FIG. 10. As described above, the protruding side lateral wall portion 49 includes the side wall main portion 50 and the rear edge side portion 51 on a rear portion side of the side wall main portion 50, the upper edge 49a in a region of the side wall main portion 50 in the protruding side lateral wall portion 49 is coupled to the left edge 38c of the upper wall portion 38, the lower edge 49b in the region of the side wall main portion 50 in the protruding side lateral wall portion 49 is coupled to the left edge 41c of the lower wall portion 41 and the rear edge 49c of the rear edge side portion 51 of the protruding side lateral wall portion 49 is coupled to an entire area of the separation edge 27b. The side wall main portion 50 of the protruding side lateral wall portion 49 and the right wall portion 54 have the same outer shape, and are left-right symmetric.

Then, in the embodiment, the rear edge 49c of the rear edge side portion 51 in the protruding side lateral wall portion 49 which is coupled to the entire area of the separation edge 27b includes an upper edge adjacent portion 49ca which extends and slightly bends from the upper edge 49a on the upper wall portion 38 side, a projection-shaped edge portion 49cb which has a projection shape and extends from the upper edge adjacent portion 49ca passing a vicinity of a top portion 64a in the protruding portion 64 which bulges away from the front collision restraining surface 60, and a lower edge adjacent portion 49cc which extends from the projection-shaped edge portion 49cb and is continuous with the lower edge 49b on the lower wall portion 41 side (with reference to FIG. 10).

As shown in FIG. 9, the separation edge 27b of the rear wall end edge portion 27 coupled to the rear edge 49c includes an upper edge 27ba coupled to the upper edge adjacent portion 49ca of the rear edge 49c in the rear edge side portion 51 of the protruding side lateral wall portion 49, a lower edge 27bc coupled to the lower edge adjacent portion 49cc of the rear edge 49c in the rear edge side portion 51 of the protruding side lateral wall portion 49, and a middle edge 27bb coupled to the projection-shaped edge portion 49cb of the rear edge 49c in the rear edge side portion 51 of the protruding side lateral wall portion 49.

Further, the upper edge 27ba and the lower edge 27bc both have shapes in which recess portions 35, 36 which are recessed so as to approach the inner edge 27e side are disposed as compared with outer shapes of the to-be-coupled upper edge adjacent portion 49ca and lower edge adjacent portion 49cc.

That is, when the rear wall end edge portion 27 made of the end edge base fabric 89 is flatly deployed, the rear wall end edge portion 27 is shaped to include a rectangular end edge main portion 28 extending in an upper-lower direction, a rearward overhang portion 29 forming a vicinity of the top portion 64a of the protruding portion 64, and the end edge-side extending portion 30 forming the restraining recess portion 66, and is shaped such that the recess portions 35, 36 are provided between upper and lower portions of the end edge main portion 28 and the rearward overhang portion 29.

In the embodiment, as shown in FIG. 9, the rear wall main portion 21 forming the rear wall portion 19 together with the rear wall end edge portion 27 is formed from a rear wall main portion forming bag base fabric (main portion base fabric) 86 made of a woven fabric such as polyamide, and further, the main portion base fabric 86 includes a separation-side base fabric 87 and an oblique collision-side base fabric 88 which are separated to the left and right. The separation-side base fabric 87 forms a wide width portion 22 on a right side of the rear wall main portion 21, and the oblique collision-side base fabric 88 forms a narrow width portion 23 on a left side of the rear wall main portion 21 which is an oblique collision restraining portion side. A boundary portion between the narrow width portion 23 and the wide width portion 22 is a central portion 24 that coincides with a center in the left-right direction of the airbag 15 when the inflation is completed, that is, a center line CL in the front-rear direction passing through a center of the attachment portion 44 (with reference to FIG. 2). Further, at a position of the central portion 24, a rear end 72b of a rear side portion 72 of the front-rear tether 70 is sewn to a coupling portion between the narrow width portion 23 and the wide width portion 22. The narrow width portion 23 (the oblique collision-side base fabric 88) and the wide width portion 22 (the separation-side base fabric 87) are sewn to each other at the position of the central portion 24 to form the rear wall main portion 21. Further, an edge of the narrow width portion 23 away from the central portion 24 is set as the edge (a left edge) 21c of the rear wall main portion 21, and is coupled to the inner edge 27e of the rear wall end edge portion 27 (the end edge base fabric 89) by sewing.

As shown in FIGS. 9 and 10, as a configuration of the bag base fabrics for forming the outer peripheral wall 17 of the airbag 15, as described above, the rear wall portion 19 is configured by the separation-side base fabric 87 for forming the wide width portion 22, the oblique collision-side base fabric 88 for forming the narrow width portion 23, and the end edge base fabric 89 for forming the rear wall end edge portion 27. The left wall portion 49 as the protruding side lateral wall portion is formed from the left wall portion base fabric 91, and the right wall portion 54 as the opposite side lateral wall portion is formed from a right wall portion base fabric 93. In the embodiment, the upper wall portion 38 and the lower wall portion 41 are formed from one sheet-shaped upper and lower wall portion base fabric 80 which includes an upper wall forming portion 81 and a lower wall forming portion 82, and in which the front edge 38a of the upper wall portion 38 and the front edge 41a of the lower wall portion 41 are continuous with each other.

Figure 7:
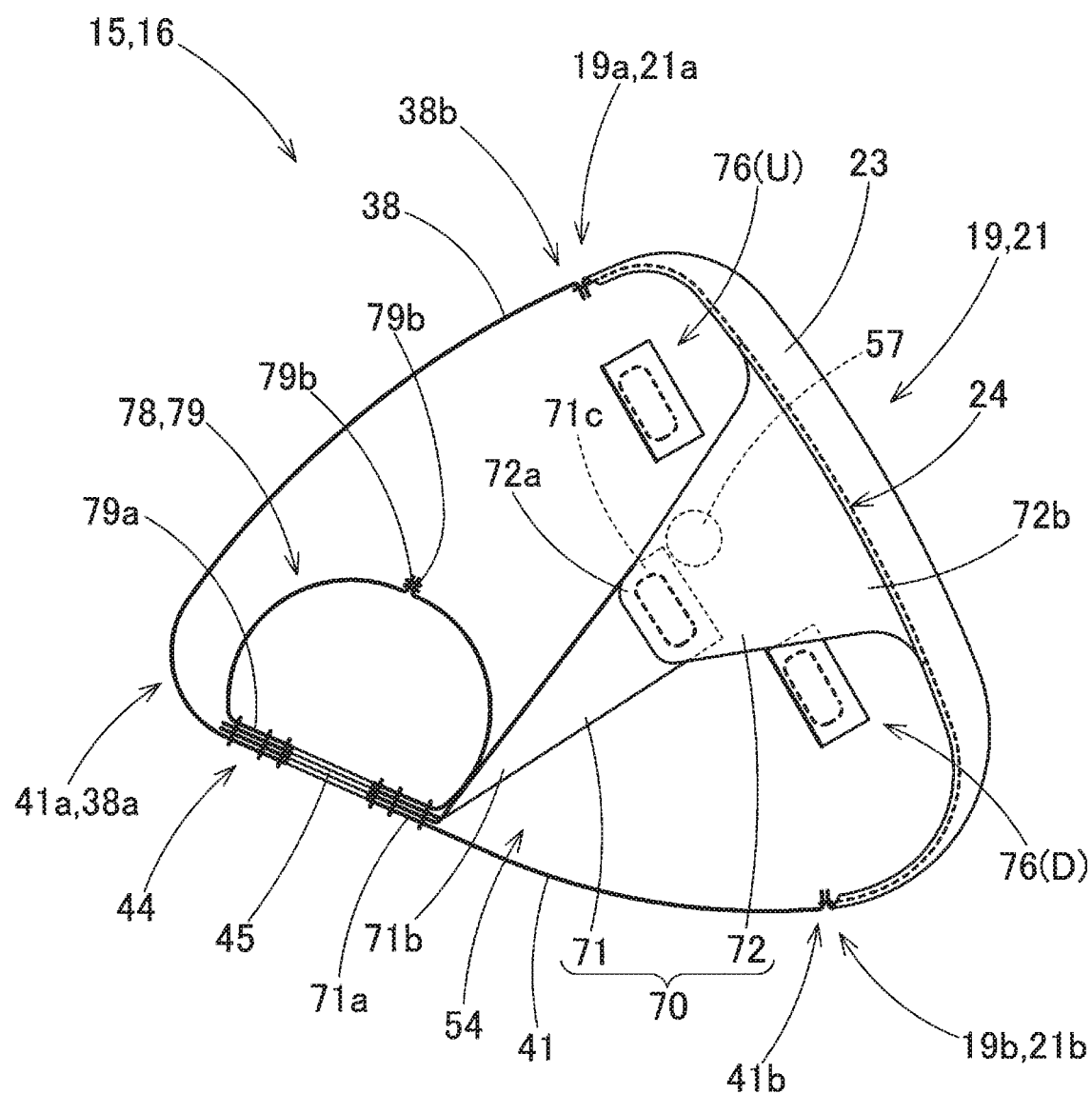
FIG. 7 is a schematic longitudinal sectional view of the airbag shown in FIG. 3 taken along a front-rear direction passing through a center in a left-right direction.

As shown in FIGS. 2 and 7, in order to prevent the central portion 24 in the left-right direction of the rear wall portion 19 of the airbag 15 from protruding rearward excessively when the inflation is completed, the tether 70 inside the airbag 15 is disposed to pull the central portion 24 forward, so that the front-rear tether 70 is set to connect a vicinity of a center in the upper-lower direction of the central portion 24 in the left-right direction of the rear wall portion 19 to the attachment portion 44. As shown in FIG. 9, the front-rear tether 70 includes a front side portion 71 integrally attached to the attachment portion 44, and a rear side portion 72 coupled to a coupling portion (the central portion) 24 of the narrow width portion 23 and the wide width portion 22. The front side portion 71 includes a connecting portion 71a co-sewn with the peripheral edge of the gas flow inlet 45 of the attachment portion 44, and a main portion 71b extending rearward from the connecting portion 71a in a band shape, the rear side portion 72 has a substantially trapezoidal shape, and a rear end 71c in the main portion 71b of the front side portion 71 is double-folded and overlapped with a front end 72a of the rear side portion 72, and further connected to the front end 72a by sewing. Further, the rear side portion 72 is coupled to the central portion 24 of the rear wall main portion 21 by sewing a rear end 72b on a lower bottom side of the trapezoidal shape.

Figure 8:
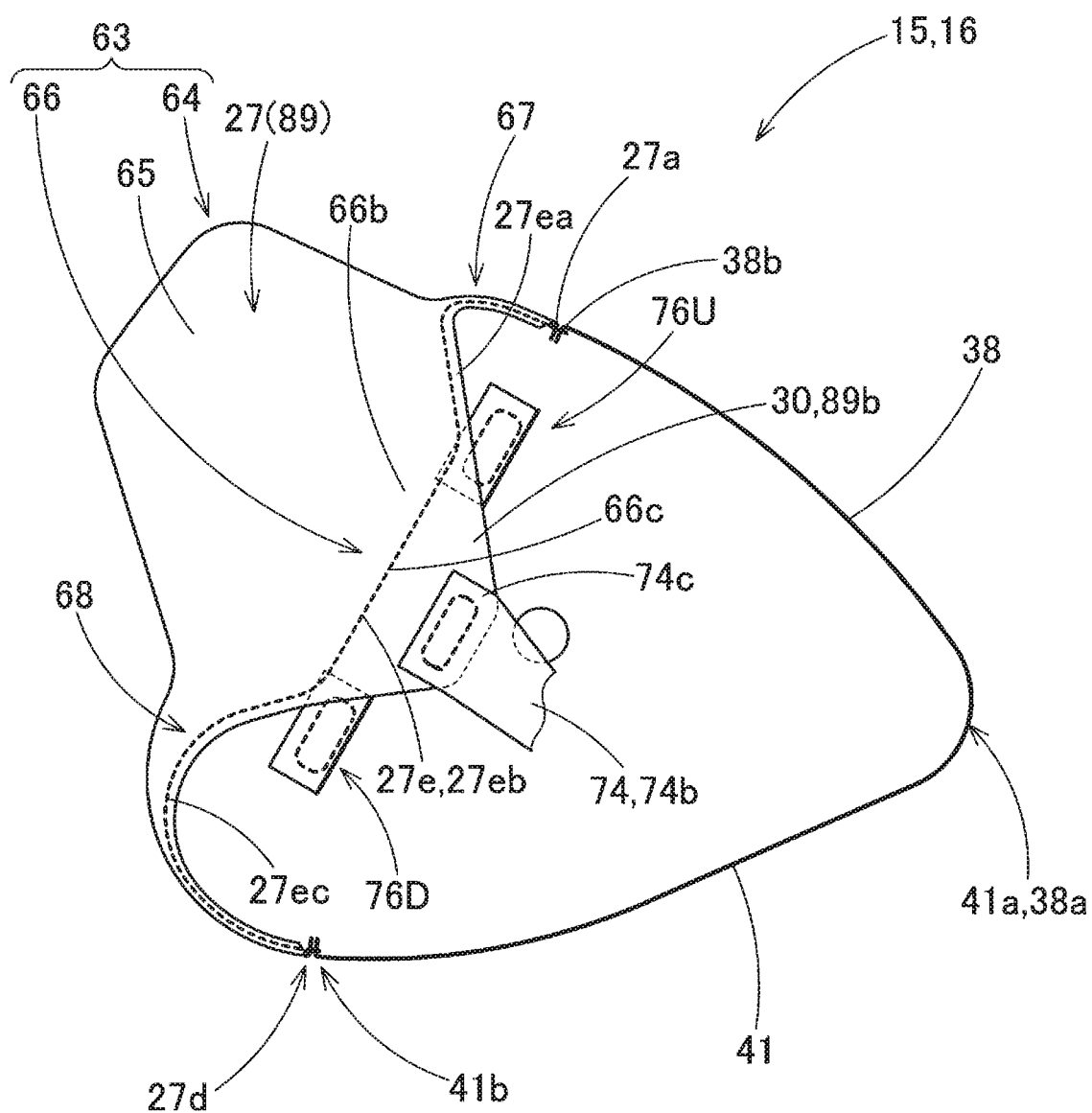
FIG. 8 is a schematic longitudinal sectional view of the airbag shown in FIG. 3 taken along the front-rear direction in a vicinity of a restraining recess portion.

As shown in FIGS. 2 and 8, as the recess portion tether 74, the tether 74 inside the airbag 15 is disposed to stabilize a recessed state of the restraining recess portion 66 of the oblique collision restraining portion 63 so as to pull a bottom portion 66c of the restraining recess portion 66 toward the front side without moving backward. As shown in FIG. 9, the recess portion tether 74 includes a connecting portion 74a co-sewn with the peripheral edge of the gas flow inlet 45 of the attachment portion 44, and a main portion 74b extending rearward from the connecting portion 74a in a band shape, and a rear end 74c of the main portion 74b is double-folded and is co-sewn with and coupled to the end edge-side extending portion 30 of the rear wall end edge portion 27 in a vicinity of the bottom portion 66c of the restraining recess portion 66 (a tether overhang portion 89b of the end edge base fabric 89) and the main portion-side extending portion 25 of the rear wall main portion 21 (a tether overhang portion 88b of the oblique collision-side base fabric 88) at a coupling position (sewing position) thereof.

Figure 16:
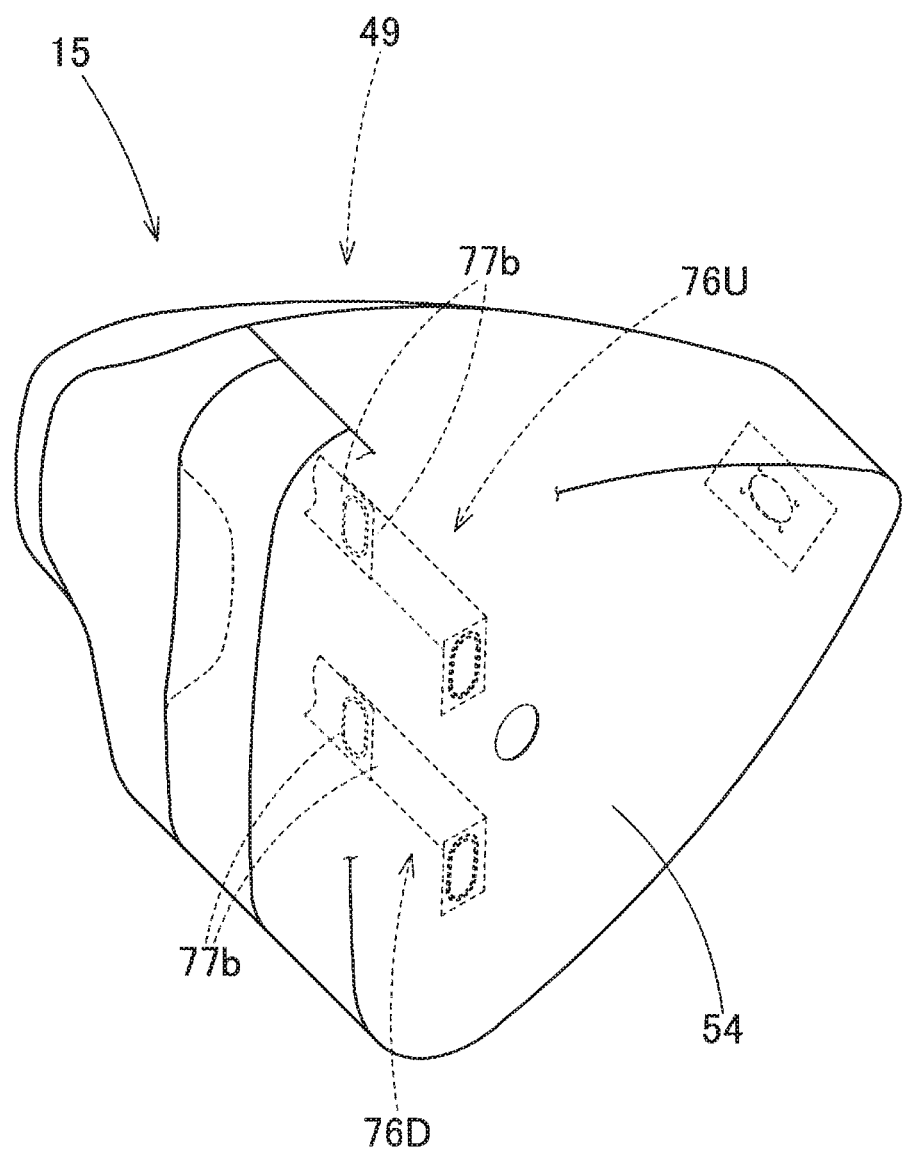
FIG. 16 is a view illustrating a manufacturing step of the airbag according to the embodiment, and the step is subsequent to those in FIGS. 15A and 15B.

As shown in FIGS. 2 and 16, the tethers 76 inside the airbag 15 are disposed, as lateral tethers 76 (U, D), to connect the left wall portion 49 and the right wall portion 54 in order to regulate a separation distance between the left wall portion 49 and the right wall portion 54 in the airbag 15 when the inflation is completed. The lateral tethers 76U, 76D are disposed in upper and lower stages in a vicinity of a middle in the front-rear direction, and are formed from two lateral tether base fabrics 77 which are separated to the left and right (with reference to FIG. 10). Therefore, the lateral tethers 76U, 76D are respectively disposed inside the airbag 15 such that one end portions 77a of the lateral tether base fabrics 77 in the left-right direction are coupled to the left wall portion 49 (the left wall portion base fabric 91) and the right wall portion 54 (the right wall portion base fabric 93) on an inner peripheral surface side of the airbag 15 by sewing, the other ends 77b approaching each other are coupled by sewing.

The flow regulating cloth 78 regulates the inflation gas flowing into the airbag 15 using the gas flow inlet 45 such that the inflation gas flows to left and right directions (with reference to FIG. 7), as shown in FIG. 9, the flow regulating cloth 78 is formed from a belt-shaped flow regulating cloth base fabric 79, a connecting portion 79a on a center is coupled to the peripheral edge of the gas flow inlet 45 by sewing, end portions 79b on both sides in the front-rear direction are coupled by sewing, and thus the flow regulating cloth 78 can be disposed inside the airbag 15.

The base fabrics forming the respective tethers 70, 74, 76 and the flow regulating cloth 78 are formed of woven fabrics such as polyamide similarly with the base fabric 80 or the like forming the outer peripheral wall 17 of the airbag 15.

Figure 11A:
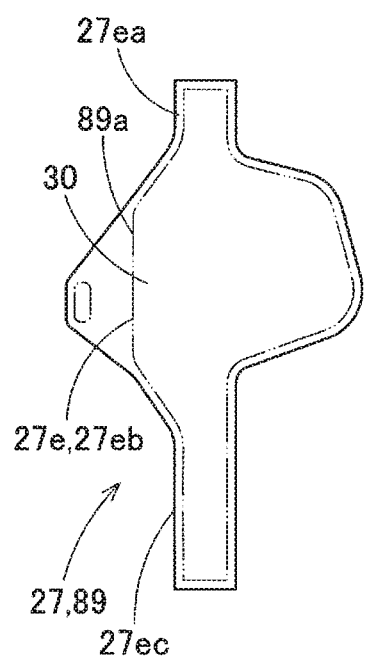
FIGS. 11A to 11D illustrate manufacturing steps of the airbag according to the embodiment in order.
Figure 11B:
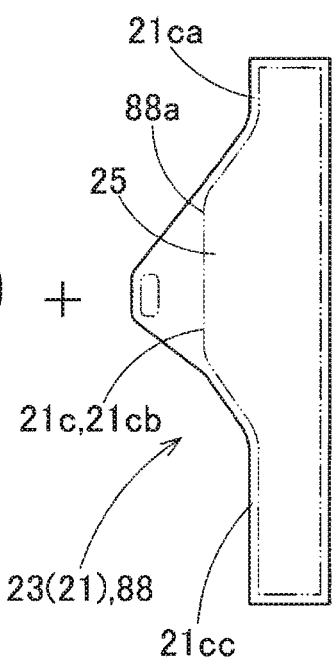
Figure 11C:
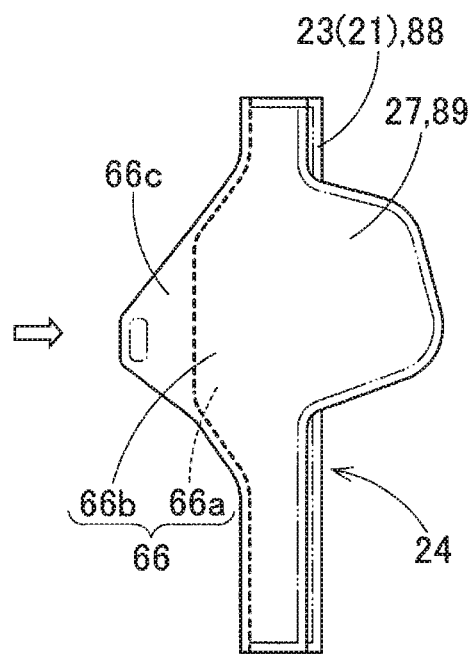

When manufacturing of the airbag 15 of the embodiment is described, first, as shown in FIGS. 11A, 11B, and 11C, the inner edge 27e of the rear wall end edge portion 27 in a seam allowance 89a of an outer peripheral edge of the end edge base fabric 89 and the end edge 21c of the rear wall main portion 21 in a seam allowance 88a of an outer peripheral edge of the oblique collision-side base fabric 88 are coupled by sewing. At this time, since the inner edge 27e and the end edge 21c are sewn together, the middle portion 27eb of the inner edge 27e and the middle portion 21cb of the end edge 21c are sewn together to form the restraining recess portion 66, upper and lower portions of the restraining recess portion 66, that is, the upper portion 27ea of the inner edge 27e is sewn to the upper portion 21ca of the end edge 21c, and the lower portion 27cc is sewn to the lower portion 21cc, so that the rear wall end edge portion 27 and the rear wall main portion 21 are coupled in a planar shape that is continuous in the left-right direction.

Figure 11D:
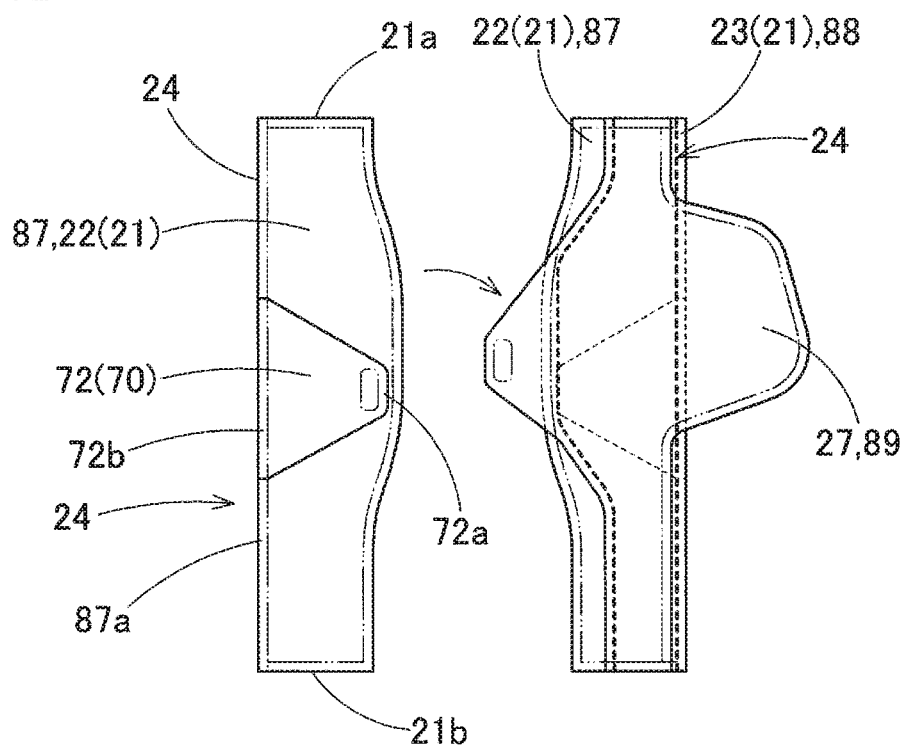

Next, as shown in FIGS. 11C and 11D, a portion on a central portion 24 side in a seam allowance 87a of an outer peripheral edge of the separation-side base fabric 87 and a portion on the central portion 24 side in the seam allowance 88a of the outer peripheral edge of the oblique collision-side base fabric 88 are overlapped and sewn. At this time, the rear end 72b of the rear side portion 72 of the front-rear tether 70 is sewn at the same time. At this time, since the separation-side base fabric 87 and the oblique collision-side base fabric 88 to which the rear wall end edge portion 27 is coupled are sewn in a planar shape so as to be continuous in the left-right direction, the rear wall portion 19 is formed.

Figure 12:
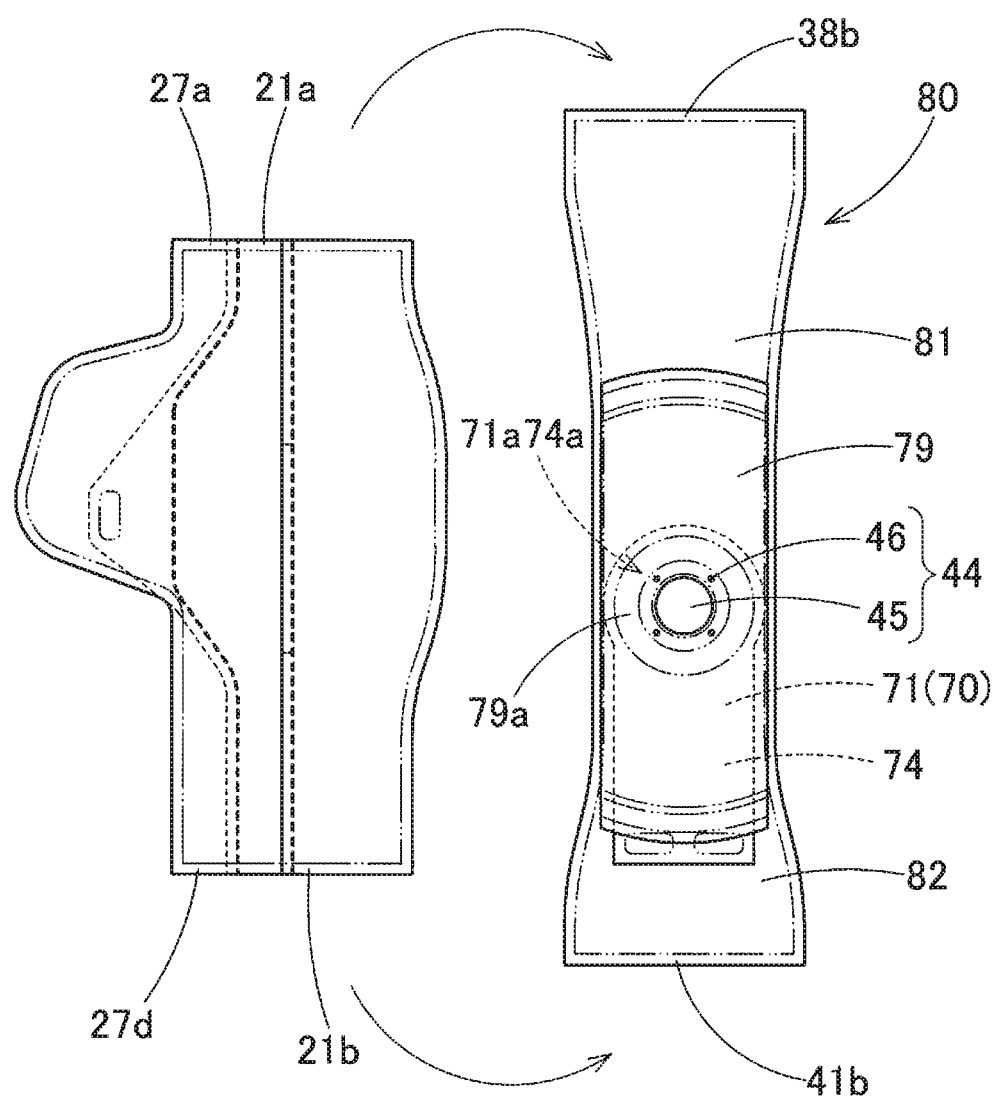
FIG. 12 is a view illustrating manufacturing steps of the airbag according to the embodiment, and the steps are subsequent to those in FIGS. 11A to 11D.

Then, as shown in FIG. 12, the connecting portion 71a of the front side portion 71 of the front-rear tether 70, the connecting portion 74a of the recess portion tether 74, and the connecting portion 79a of the flow regulating cloth base fabric 79 are sewn to a position of the attachment portion 44 of the upper and lower wall portion base fabric 80. Actually, the gas flow inlet 45 and the attachment hole 46 are not disposed in the attachment portion 44 and the connection portions 71a, 74a, and 79a, and the gas flow inlet 45 and the attachment hole 46 are opened after the sewing.

Then, as shown in FIGS. 13A and 13B, the rear edge 38b of the upper wall portion 38 in a seam 80a at both front and rear ends of the upper and lower wall portion base cloth 80 is coupled to the upper edge 27a of the rear wall end edge portion 27 (the end edge base fabric 89) of the rear wall portion 19 and the upper edge 21a of the rear wall main portion 21 (the separation-side base fabric 87 and the oblique collision-side base fabric 88) by sewing, the rear edge 41b of the lower wall portion 41 in the seam 80a at both front and rear ends of the upper and lower wall portion base fabric 80 is coupled to the lower edge 27d of the rear wall end edge portion 27 (the end edge base fabric 89) of the rear wall portion 19 and the lower edge 21b of the rear wall main portion 21 (the separation-side base fabric 87 and the oblique collision-side base fabric 88) by sewing, and thus an annular body 84 in which the upper wall portion 38, the lower wall portion 41, and the rear wall portion 19 are continuous is formed.

Figure 14:
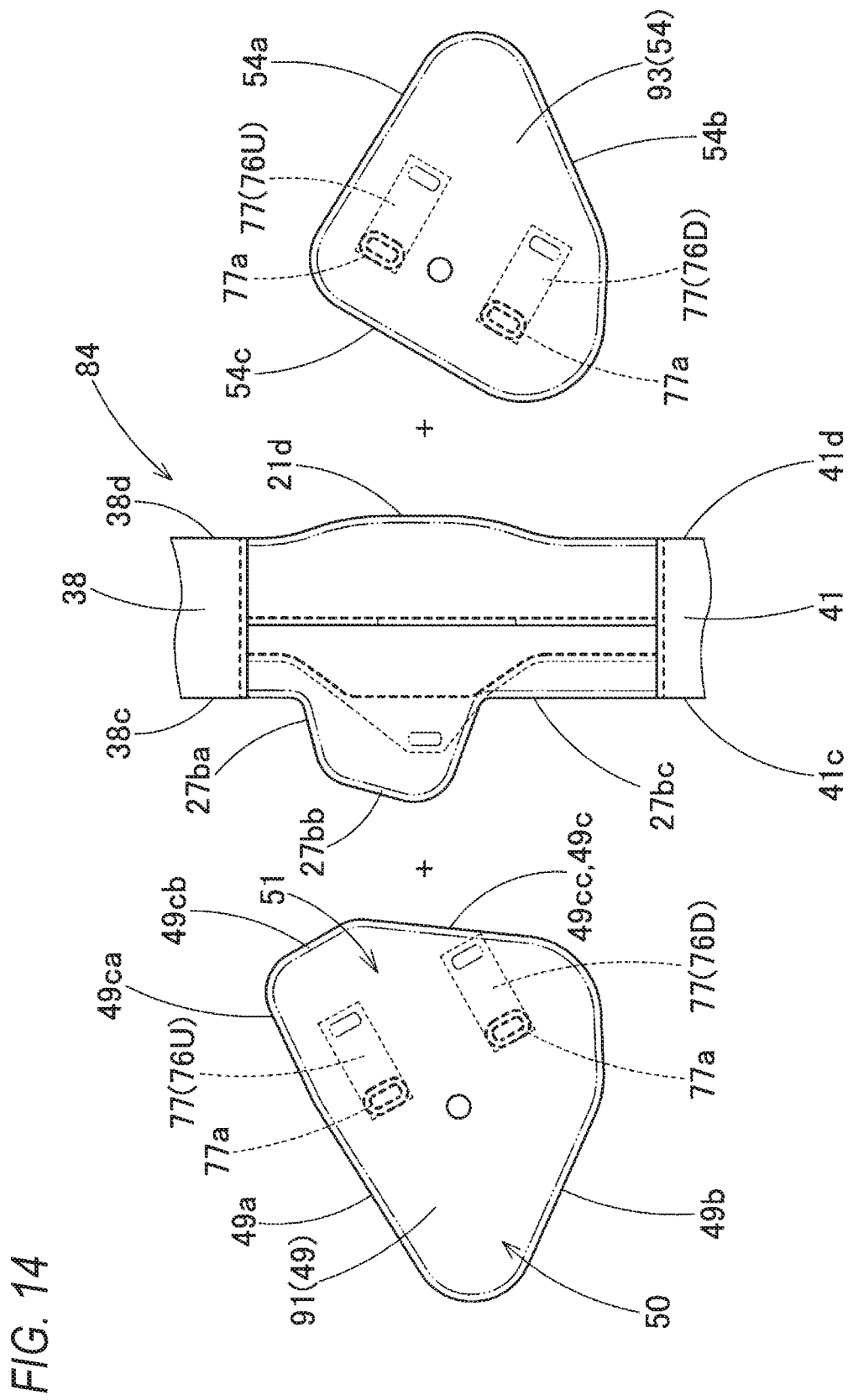
FIG. 14 is a view illustrating manufacturing steps of the airbag according to the embodiment, and the steps are subsequent to those in FIGS. 13A and 13B.

Next, as shown in FIG. 14, the end portions 77a of the lateral tether base fabrics 77 are sewn to predetermined positions on the left wall portion base fabric 91 for forming the protruding side lateral wall portion (the left wall portion) 49 and the right wall portion base fabric 93 for forming the opposite side lateral wall portion (the right wall portion) 54, and then outer peripheral edges of the left wall portion base fabric 91 and the right wall portion base fabric 93 are sewn to the corresponding annular body 84.

Specifically, a portion of the left wall portion base fabric 91 on an upper edge 49a side of the side wall main portion 50 is sewn to the left edge 38c of the upper wall portion 38 of the annular body 84, a portion of the left wall portion base fabric 91 on a lower edge 49b side of the side wall main portion 50 is sewn to the left edge 41c of the lower wall portion 41 of the annular body 84, and then, the rear edge 49c of the rear edge side portion 51 of the left wall portion base fabric 91 is sewn to the separation edge 27b of the rear wall end edge portion 27 of the annular body 84. Specifically, as described, the upper edge adjacent portion 49ca of the rear edge 49c is sewn to the upper edge 27ba of the separation edge 27b, the projection-shaped edge portion 49cb is sewn to the middle edge 27bb of the separation edge 27b, and the lower edge adjacent portion 49cc is sewn to the lower edge 27bc of the separation edge 27b.

A portion of the right wall portion base cloth 93 on an upper edge 54a side of the right wall portion 54 is sewn to the right edge 38d of the upper wall portion 38 of the annular body 84, a portion of the right wall portion base cloth 93 on a lower edge 54b side of the right wall portion 54 is sewn to the right edge 41d of the lower wall portion 41 of the annular body 84, and a portion of the right wall portion base fabric 93 on a rear edge 54c side of the right wall portion 54 is sewn to the right edge 21d of the rear wall main portion 21 of the annular body 84.

The sewing described above is performed in such a manner that an inner peripheral surface side of the airbag 15 is disposed on an outer surface side, and after completion of the sewing operation, front and back are reversed by using the gas flow inlet 45.

Figure 15A:
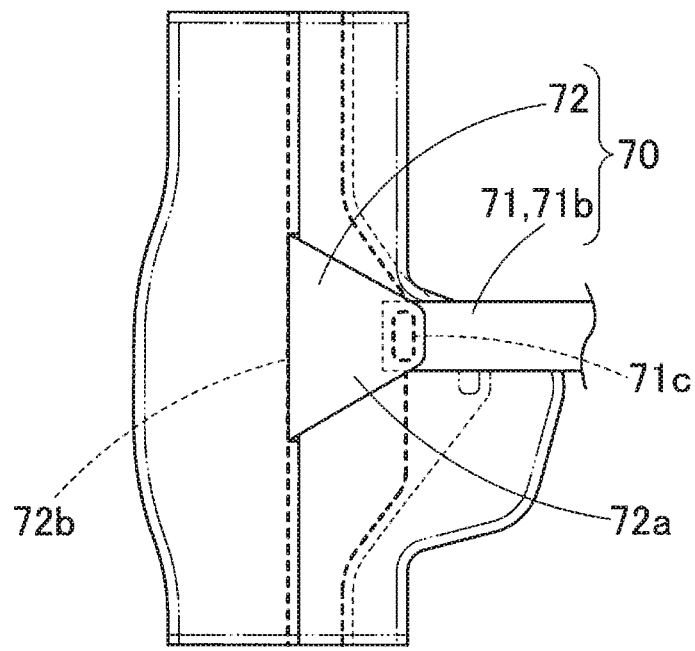
FIGS. 15A and 15B illustrate manufacturing steps of the airbag according to the embodiment, and the steps are subsequent to those in FIG. 14.
Figure 15B:
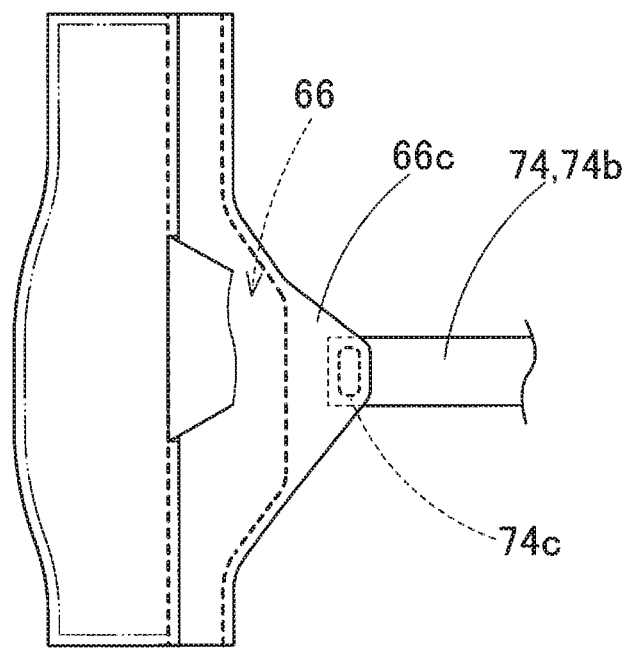
Figure 17:
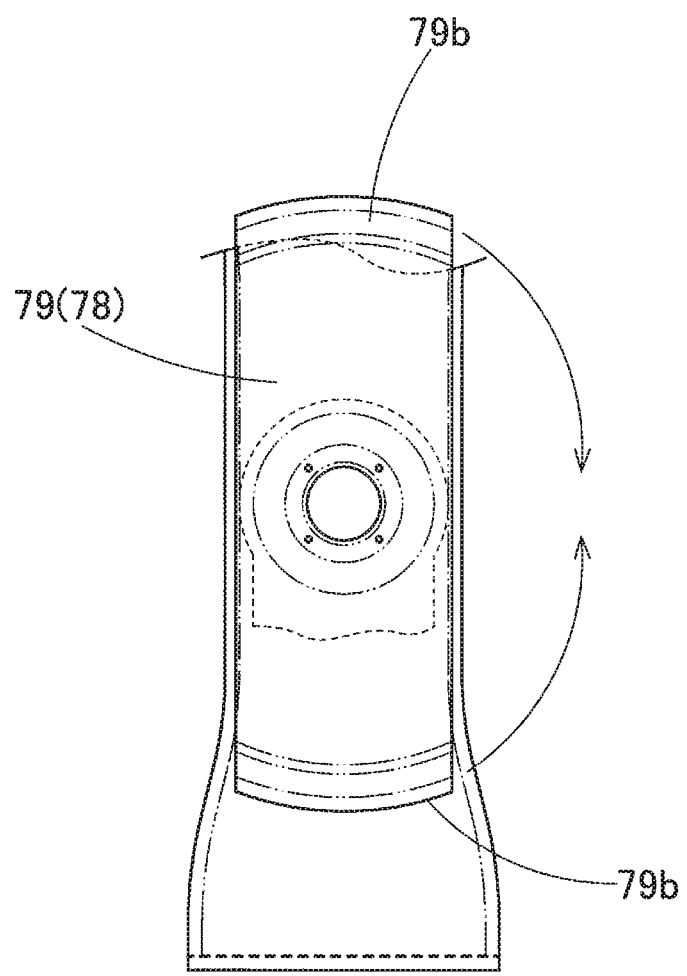
FIG. 17 is a view illustrating a manufacturing step of the airbag according to the embodiment, and the step is subsequent to that in FIG. 16.

Next, as shown in FIGS. 15A and 15B, the double-folded rear end 71c of the front side portion 71 of the front-rear tether 70 and the front end 72a of the rear side portion 72 are coupled by sewing, and the double-folded rear end 74c of the recess portion tether 74 is coupled to the bottom portion 66c of the restraining recess portion 66 by sewing. Further, in order to form the lateral tethers 76U, 76D (with reference to FIG. 16), corresponding end portions 77b are sewn together. Further, when the end portions 79b of the flow regulating cloth base fabric 79 are sewn together so as to form the flow regulating cloth 78 (with reference to FIG. 17), the sewing operation is completed. Then, when the front and back are reversed using the gas flow inlet 45, the airbag 15 can be manufactured.

The airbag 15 manufactured in this manner is folded so as to be stored in the case 12 in a state where the retainer 9 is housed inside, and the folded airbag 15 is wrapped around by a breakable wrapping sheet (not shown) so as not to collapse. Next, the folded airbag 15 is placed on the bottom wall portion 12a of the case 12, the main portion 8a of the inflator 8 is inserted into the case 12 from below the bottom wall portion 12a, the bolts 9a of the retainer 9 protruding downward from the bottom wall portion 12a are inserted into the flange portion 8c of the inflator 8, and when the nuts 10 are fastened to the respective bolts 9a protruding from the flange portion 8c of the inflator 8, the folded airbag 15 and the inflator 8 can be attached to the case 12.

Further, the connecting wall portion 6c of the airbag cover 6 in the instrument panel 1 mounted on the vehicle V is locked to the peripheral wall portion 12b of the case 12, and when the bracket (not shown) of the case 12 is fixed to the body side of the vehicle V, the passenger seat airbag device M can be mounted on the vehicle V.

In the passenger seat airbag device M of the embodiment, in a state where the airbag 15 is mounted on the vehicle V, in front collision, oblique collision or offset collision of the vehicle V, when the inflation gas is discharged from the gas discharge port 8b of the inflator 8, the inflation gas flows into the airbag 15, the airbag 15 inflates to push and open the doors 6a, 6a of the airbag cover 6, protrudes upward from the case 12 passing through an opening formed by opening the doors 6a, 6b of the airbag cover 6, and is deployed and inflated while protruding toward the vehicle rear side. As shown in two-dot chain lines in FIGS. 1 and 2, the inflation is completed such that the airbag 15 blocks a space between the upper surface 2 of the instrument panel 1 and a windshield 4 above the instrument panel 1.

When inflation of the airbag 15 is completed, on a rear wall portion 19 side of the airbag 15, the front collision restraining surface 60 is deployed, the protruding portion 64 of the oblique collision restraining portion 63 protruding from the edge 21c side of the front collision restraining surface 60 protrudes rearward, and the oblique collision restraining surface 65 is disposed on the front collision restraining surface 60 side of the protruding portion 64. Therefore, as indicated by the two-dot chain line in FIG. 2, in the vehicle collision, when the head MH of the occupant MP moves forward, the front collision restraining surface 60 can receive the head MH of the occupant MP, further, even when the head MH of the occupant MP moves obliquely forward on the protruding portion 64 side, the oblique collision restraining surface 65 can receive the moving head MH, or the restraining recess portion 66 of the oblique collision restraining portion 63 between the oblique collision restraining surface 65 and the front collision restraining surface 60 can stop rotation of the head MH and restrain the head MH, and the head of the occupant can be accurately protected.

Then, in the airbag 15 when the inflation is completed, the rear wall end edge portion 27 of the oblique collision restraining portion 63 is formed from one sheet-shaped bag base fabric (end edge base fabric) 89 for forming the rear wall end edge portion, and the upper and lower edges 27a, 27d in the outer peripheral edge are respectively continuous with the upper and lower edges 21a, 21b of the rear wall main portion 21 in the left-right direction, and are respectively coupled to the rear edge 38b of the upper wall portion 38 and the rear edge 41b of the lower wall portion 41. Then, in the separation edge 27b which has a shape bulging away from the front collision restraining surface 60 and is between the upper edge 27a and the lower edge 27d, an entire area between the upper edge 27a and the lower edge 27d is coupled to the rear edge 49c side of the rear edge side portion 51 of the protruding side lateral wall portion 49, and in the inner edge 27e of the rear wall main portion 21 side which is opposite to the separation edge 27b between the upper edge 27a and the lower edge 27d in the left and right direction, the upper portion 27ea and the lower portion 27ec of the end edge-side extending portion 30 forming the restraining recess portion 66 are coupled to the corresponding edges 21ca and 21cc of the rear wall main portion 21 so as to be continuous in the left-right direction. That is, during inflation of the airbag 15, as tension along the left-right direction, tensile forces T1 and T2 act (with reference to FIGS. 3 to 6) on the separation edge 27b side of the rear wall end edge portion 27 forming the entire area of a vertical ridgeline of the protruding portion 64 of the oblique collision restraining portion 63, from the inner edge 27e side that is shifted toward the rear wall main portion 21 side across width dimensions Bu, Bd in the left-right direction of the upper edge 27a and the lower edge 27d which are coupled to the upper wall portion 38 and the lower wall portion 41 (with reference to FIGS. 3, 5, and 6), and behavior of the protruding portion 64 away from the rear wall main portion 21 side is prevented. As a result, an increase in a width dimension W0 of the airbag 15 is prevented. Then, in the restraining recess portion 66 that increases a film length in the left-right direction, at the upper and lower portions 67, 68 in an entire area of being coupled to the upper wall portion 38 and the lower wall portion 41, the inner edge 27e of the rear wall end edge portion 27 and the end edge 21c of the rear wall main portion 21 are coupled so as to be continuous in the left-right direction, so that behavior of increasing the width dimension W0 of the airbag 15 is prevented as much as possible even when the restraining recess portion 66 is provided.

Therefore, in the passenger seat airbag device M of the embodiment, even if the airbag 15 includes the oblique collision restraining portion 63, it is possible to prevent an increase in the width dimension W0 of the airbag 15 in the left-right direction when the inflation is completed.

Further, in the embodiment, since the left wall portion 49 and the right wall portion 54 of the airbag 15 when the inflation is completed are connected by the lateral tethers 76U, 76D that regulate the separation distance therebetween (with reference to FIGS. 2, 7, 8 and 16), an increase in the width dimension W0 of the airbag 15 in the left-right direction when the inflation is completed is further prevented.

In the embodiment, two lateral tethers 76U, 76D on the upper and lower stages are disposed, but one lateral tether may be disposed at a substantially middle position in the upper-lower direction between the left wall portion 49 and the right wall portion 54. However, as in the embodiment, when two upper and lower stages are disposed, or a plurality is arranged in the front and rear, the separation distance between the left wall portion 49 and the right wall portion 54 can be regulated in a wide area, which is suitable for controlling the width dimension W0.

Further, in the passenger seat airbag device M of the embodiment, the rear edge 49c of the rear edge side portion 51 of the protruding side lateral wall portion 49 of the airbag 15 coupled to the separation edge 27b includes, as shown in FIGS. 10 and 14, the upper edge adjacent portion 49ca which extends from the upper edge 49a on the upper wall portion 38 side, the projection-shaped edge portion 49cb which has a projection shape and extends from the upper edge adjacent portion 49ca passing the vicinity of the top portion 64a in the protruding portion 64 which bulges away from the front collision restraining surface 60, and the lower edge adjacent portion 49cc which extends from the projection-shaped edge portion 49cb and is continuous with the lower edge 49b on the lower wall portion 41 side As shown in FIGS. 9 and 14, the separation edge 27b of the rear wall end edge portion 27 in the airbag 15 includes the upper edge 27ba coupled to the upper edge adjacent portion 49ca of the rear edge 49c in the rear edge side portion 51 of the protruding side lateral wall portion 49, the lower edge 27bc coupled to the lower edge adjacent portion 49cc of the rear edge 49c in the rear edge side portion 51 of the protruding side lateral wall portion 49, and the middle edge 27bb coupled to the projection-shaped edge portion 49cb of the rear edge 49c in the rear edge side portion 51 of the protruding side lateral wall portion 49. Further, the upper edge 27ba and the lower edge 27bc both have shapes in which the recess portions 35, 36 which are recessed so as to approach the inner edge 27e side are disposed as compared with outer shapes of the to-be-coupled upper edge adjacent portion 49ca and lower edge adjacent portion 49cc.

Therefore, in the embodiment, the upper edge 27ba and the lower edge 27bc of the separation edge 27b of the rear wall end edge portion 27 both have shapes in which the recess portions 35, 36 which are recessed to approach the inner edge 27e side of the rear wall end edge portion 27 are disposed as compared with the to-be-coupled upper edge adjacent portion 49ca and lower edge adjacent portion 49cc of the rear edge 49c in the rear edge side portion 51 of the protruding side lateral wall portion 49, and are shaped such that the width dimensions Wu, Wd (with reference to FIG. 9) of the rear wall end edge portion 27 in the left-right direction are narrowed. When the airbag 15 is inflated, without reducing an amount of protruding in a vicinity of the top portion 64a protruding rearward of the protruding portion 64, the recess portions 35, 36 that narrow the width dimensions Wu, Wd of the rear wall end edge portion 27 have an effect of pulling the protruding portion 64 itself toward the inner edge 27e side, that is, toward the front collision restraining surface 60 side. Therefore, the behavior of the protruding portion 64 away from the rear wall main portion 21 side is prevented, and as a result, an increase in the width dimension W0 of the airbag 15 is further prevented.

In the passenger seat airbag device M of the embodiment, the protruding side lateral wall portion 49 of the airbag 15 is disposed with the outer peripheral edge thereof being coupled to only the lower wall portion 41, the upper wall portion 38, and the separation edge 27b of the rear wall end edge portion 27. That is, in entire outer peripheral edge of the protruding side lateral wall portion 49, the lower edge 49b is coupled to the left edge 41c of the lower wall portion 41, the upper edge 49a is coupled to the left edge 38c of the upper wall portion 38, and the rear edge 49c is coupled to the separation edge 27b of the rear wall end edge portion 27.

Therefore, in the embodiment, the protruding side lateral wall portion 49 which is a side wall portion of the airbag 15 on a side where the oblique collision restraining portion 63 is provided are disposed with the outer peripheral edge thereof being coupled to only the lower wall portion 41, the upper wall portion 38, and the rear wall end edge portion 27. When being coupled to the outer peripheral edge of the protruding side lateral wall portion 49, only portions at three positions of the lower wall portion 41, the upper wall portion 38, and the rear wall end edge portion 27 serving as to-be-coupled members, are coupled. Since it is sufficient to prepare as above, there is no need to prepare in advance to connect many, four or more parts to each other as in the related art, and the coupling operation can be easily performed.

In this case, in the embodiment, the upper wall portion 38 and the lower wall portion 41 of the airbag 15 are formed from one sheet-shaped bag base fabric (the upper and lower wall portion base fabric) 80 for forming the upper and lower wall portions whose front edges 38a and 41a are continuous.

Therefore, in the embodiment, the coupling operation between the lower wall portion 41 and the upper wall portion 38 can be omitted, so that the coupling operation of the outer peripheral edge of the side wall portion 49 on the side where the oblique collision restraining portion 63 is disposed in the airbag 15 can be performed easily.

Figure 18:
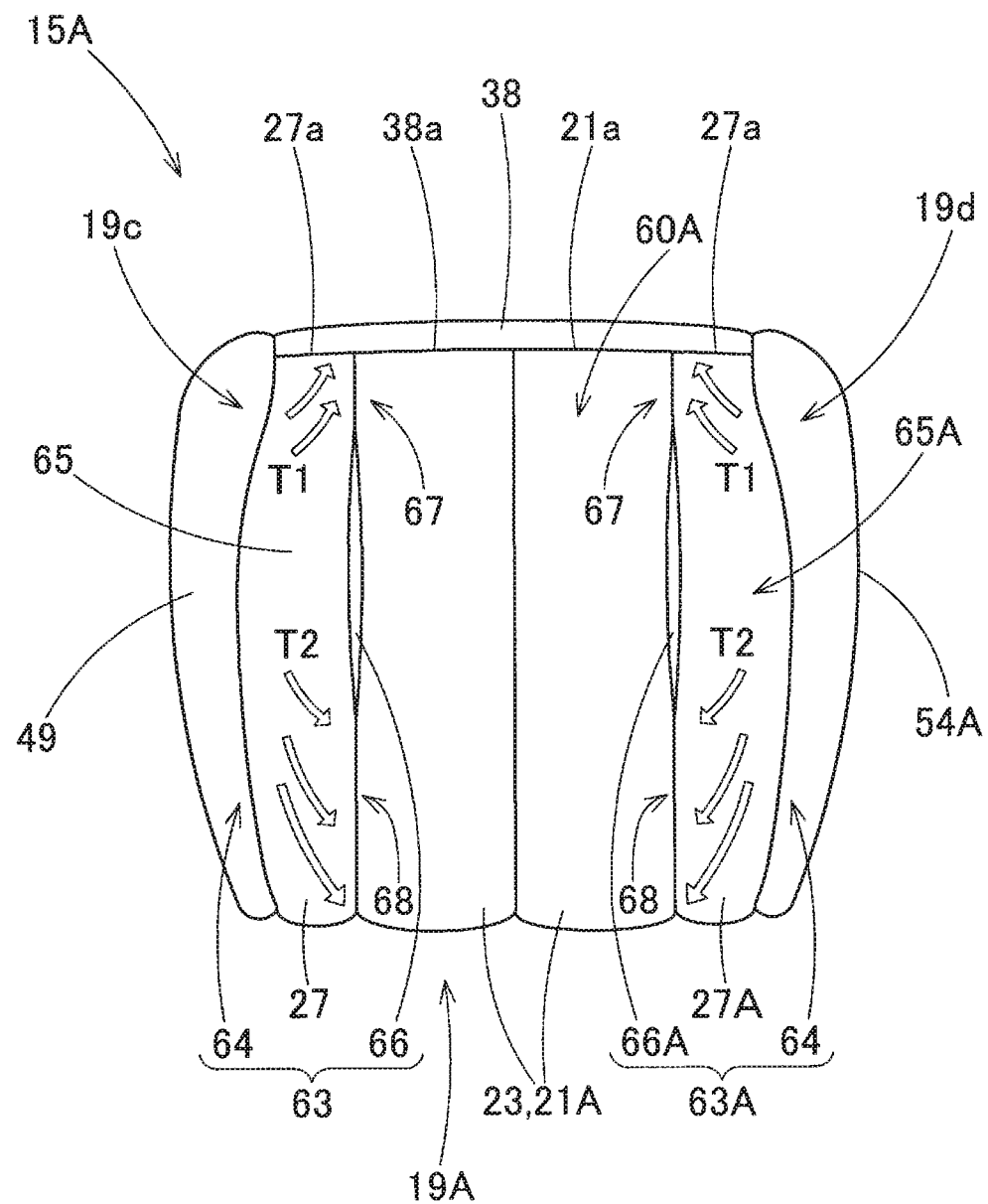
FIG. 18 is a schematic front view showing a modification of the airbag according to the embodiment.
Figure 19:
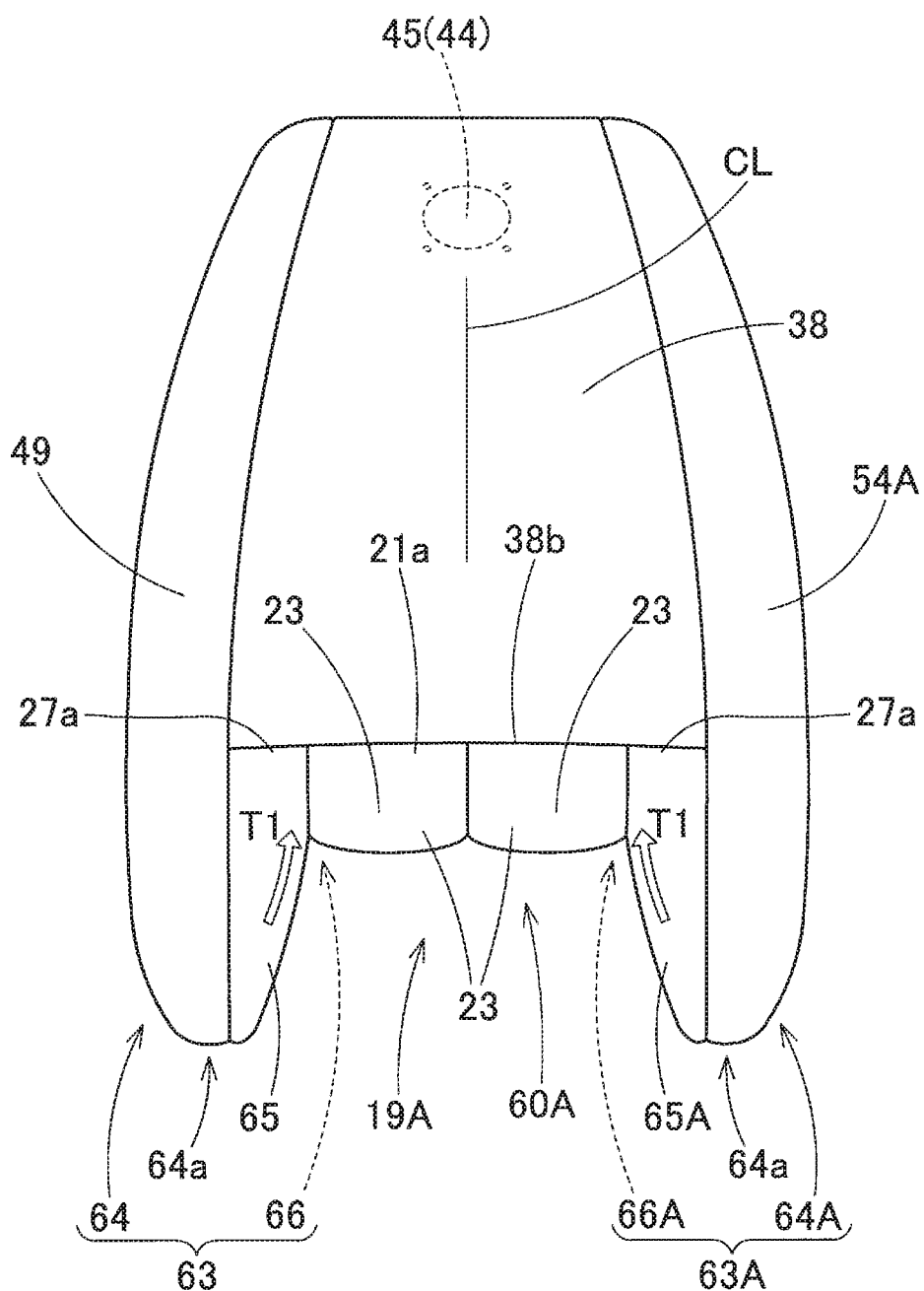
FIG. 19 is a schematic plan view of the airbag shown in FIG. 18.

In the passenger seat airbag device M of the embodiment, the oblique collision restraining portion 63 provided in the airbag 15 is disposed on the left wall portion 49 side, which is a central side of the vehicle V in the vehicle width direction, but correspondingly to the vehicle, for example, in a left-hand drive vehicle, the oblique collision restraining portion 63 may be disposed on a right wall portion 54 side which is the central side of the vehicle in the vehicle width direction. Further, as in the airbag 15A shown in FIGS. 18 and 19, the oblique collision restraining portions 63, 63A may be disposed on both left and right sides of a rear wall portion 19A.

In the airbag 15A, a front collision restraining surface 60A is disposed at a center of the rear wall portion 19A in the left-right direction, and the oblique collision restraining portions 63, 63A are disposed on both left and right sides of the front collision restraining surface 60A. In the airbag 15A, the oblique collision restraining portions 63 of the airbag 15 of the embodiment are disposed symmetrically to right wall portion 54A sides. That is, in the airbag 15A, the left wall portion 49 and the right wall portion 54A, which are the left and right wall portions 49, 54A, are both protruding side lateral wall portions on which the protruding portions 64, 64A of the oblique collision restraining portions 63, 63A are disposed. Further, the oblique collision restraining portions 63, 63A are configured such that surfaces of the protruding portions 64, 64A on the front collision restraining surface 60A side are defined as the oblique collision restraining surfaces 65, 65A, and restraining recess portions 66, 66A are provided on edge side adjacent to the front collision restraining surface 60A. Similarly to the restraining recess portion 66, the restraining recess portion 66A is disposed such that a bottom portion thereof is pulled forward by a recess portion tether (not shown). The front collision restraining surface 60A is configured such that the narrow width portions 23 of the embodiment are symmetrically arranged on both left and right sides with respect to a center line CL along the front-rear direction passing through a center of the airbag 15A in the left-right direction. In the airbag 15A, the similar effects as those of the embodiment can be obtained.

According to an aspect of the invention, there is provided a passenger seat airbag device comprising: an airbag which is folded and stored at a storage portion disposed in an instrument panel on a front side of an occupant seated in a passenger seat, and which is deployed and inflated to be able to protect the occupant by protruding from the storage portion to a vehicle rear side when an inflation gas flows in, the airbag including: as an outer peripheral wall when the inflation is completed, a rear wall portion on a rear portion side; an upper wall portion extending forward from an upper edge side of the rear wall portion; a lower wall portion which extends forward from a lower edge side of the rear wall portion, and in which a vicinity of a center in a left-right direction on a front portion side thereof is set as an attachment portion for attaching the airbag to the storage portion while allowing the inflation gas to flow inside; and a left wall portion and a right wall portion which extend forward respectively from left and right edges of the rear wall portion and whose upper and lower edges are connected to the upper wall portion and the lower wall portion, and the airbag further including, on a rear wall portion side when the inflation is completed: a front collision restraining surface configured to receive a head of the occupant that moves forward in a front collision of a vehicle; and an oblique collision restraining portion configured to receive the head of the occupant that moves obliquely forward in an oblique collision or offset collision of the vehicle, and the oblique collision restraining portion including: a protruding portion which protrudes rearward from a left-right direction edge side of the front collision restraining surface, and in which a surface on a front collision restraining surface side is set as an oblique collision restraining surface configured to receive the head of the occupant that moves obliquely forward; and a restraining recess portion which is disposed on the front collision restraining surface side of the protruding portion, which extends forward from adjacent edges of the oblique collision restraining surface and the front collision restraining surface, and whose facing surfaces are able to restrain the head of the occupant, wherein the rear wall portion of the airbag includes a rear wall main portion and a rear wall end edge portion on the oblique collision restraining portion side, which are separated to the left and right with the restraining recess portion interposed therebetween, the rear wall main portion has a configuration in which the front collision restraining surface is disposed, the rear wall end edge portion has a configuration in which the oblique collision restraining surface is disposed, a surface of the protruding portion of the airbag which is on an opposite side of the oblique collision restraining surface is formed from a rear edge side portion in a protruding side lateral wall portion constituting the left wall portion or the right wall portion on a side where the protruding portion is disposed, the oblique collision restraining surface is formed from the rear wall end edge portion, the restraining recess portion of the airbag is formed by connecting a peripheral edge of an end edge-side extending portion extending forward from an inner edge of the rear wall end edge portion on a rear wall main portion side, and a peripheral edge of a main portion-side extending portion extending forward from an edge of the rear wall main portion on a rear wall end edge portion side, the rear wall end edge portion is formed from a sheet-shaped bag base fabric for forming the rear wall end edge portion, and the bag base fabric has an outer peripheral edge including: an upper edge on an upper wall portion side; a lower edge on a lower wall portion side; a separation edge which is an edge on a side away from the front collision restraining surface between the upper edge and the lower edge, and which is shaped to bulge away from an edge on the front collision restraining surface side; and an inner edge on the front collision restraining surface side between the upper edge and the lower edge, the upper edge of the rear wall end edge portion is continuous with an upper edge of the rear wall main portion in the left-right direction, and is coupled to a rear edge of the upper wall portion, the lower edge of the rear wall end edge portion is continuous with a lower edge of the rear wall main portion in the left-right direction, and is coupled to a rear edge of the lower wall portion, an entire edge of the separation edge of the rear wall end edge portion is coupled to a rear edge of the rear edge side portion of the protruding side lateral wall portion, and the inner edge of the rear wall end edge portion includes a middle portion which is an edge portion of the end edge-side extending portion to be coupled to the main portion-side extending portion, and upper and lower portions of the middle portion are coupled to corresponding edge portions of the rear wall main portion on the rear wall end edge portion side such that the rear wall end edge portion and the rear wall main portion are continuous in the left-right direction.

In the passenger seat airbag device according to the present invention, when inflation of the airbag is completed, on a rear wall portion side of the airbag, the front collision restraining surface is deployed, the protruding portion of the oblique collision restraining portion protruding from the edge side of the front collision restraining surface protrudes rearward, and the oblique collision restraining surface is disposed on the front collision restraining surface side of the protruding portion. Therefore, in the vehicle collision, when the head of the occupant moves forward, the front collision restraining surface can receive the head of the occupant, further, even when the head of the occupant moves obliquely forward on the protruding portion side, the oblique collision restraining surface can receive the moving head, or the restraining recess portion of the oblique collision restraining portion between the oblique collision restraining surface and the front collision restraining surface can stop rotation of the head and restrain the head, and the head of the occupant can be accurately protected. Then, in the airbag when the inflation is completed, the rear wall end edge portion of the oblique collision restraining portion is formed from one sheet-shaped bag base fabric for forming the rear wall end edge portion, and the upper and lower edges in the outer peripheral edge are respectively continuous with the upper and lower edges of the rear wall main portion in the left-right direction, and are respectively connected to the rear edge of the upper wall portion and the rear edge of the lower wall portion. In this state, in the rear wall end edge portion, in the separation edge which has a shape bulging away from the front collision restraining surface and is between the upper edge and the lower edge, an entire area between the upper edge and the lower edge is connected to the rear edge of the rear edge side portion of the protruding side lateral wall portion, and in the inner edge of the rear wall main portion side which is Opposite to the separation edge between the upper edge and the lower edge in the left and right direction, the upper portion and the lower portion of the end edge-side extending portion forming the restraining recess portion are connected to the corresponding edges of the rear wall main portion so as to be continuous in the left-right direction. That is, during inflation of the airbag, as tension along the left-right direction, tensile forces act on the separation edge side of the rear wall end edge portion forming the entire area of a vertical ridgeline of the protruding portion of the oblique collision restraining portion, from the inner edge side that is shifted toward the rear wall main portion side across width dimensions in the left-right direction of the upper edge and the lower edge which are connected to the upper wall portion and the lower wall portion, and behavior of the protruding portion away from the rear wall main portion side is prevented. As a result, an increase in a width dimension of the airbag is prevented. Then, in the restraining recess portion that increases a film length in the left-right direction, at the upper and lower portions, in an entire area of being connected to the upper wall portion and the lower wall portion, the inner edge of the rear wall end edge portion and the end edge of the rear wall main portion are connected so as to be continuous in the left-right direction, so that behavior of increasing the width dimension of the airbag is prevented as much as possible even when the restraining recess portion is provided.

Therefore, in the passenger seat airbag device according to the present invention, even if the airbag includes the oblique collision restraining portion, it is possible to prevent an increase in the width dimension of the airbag in the left-right direction when the inflation is completed.

Further, in this case, since the left wall portion and the right wall portion of the airbag when the inflation is completed are connected by the lateral tether that regulates the separation distance therebetween, the increase in the width dimension of the airbag in the left-right direction when the inflation is completed is further prevented.

The rear edge, which is coupled to the separation edge, of the rear edge side portion in the protruding side lateral wall portion of the airbag may include: an upper edge adjacent portion extending from an upper edge on an upper wall portion side; a projection-shaped edge portion which has a projection shape and extends from the upper edge adjacent portion passing a vicinity of a top portion in the protruding portion which bulges away from the front collision restraining surface; and a lower edge adjacent portion which extends from the projection-shaped edge portion and is continuous with the lower edge on the lower wall portion side, the separation edge of the rear wall end edge portion in the airbag may include: an upper edge coupled to the upper edge adjacent portion of the rear edge in the rear edge side portion of the protruding side lateral wall portion; a lower edge coupled to the lower edge adjacent portion of the rear edge in the rear edge side portion of the protruding side lateral wall portion; and a middle edge coupled to the projection-shaped edge portion of the rear edge in the rear edge side portion of the protruding side lateral wall portion, and the upper edge and the lower edge both may have shapes in which recess portions which are recessed so as to approach the inner edge side are disposed as compared with outer shapes of the to-be-coupled upper edge adjacent portion and lower edge adjacent portion.

In such a configuration, the upper edge and the lower edge of the separation edge of the rear wall end edge portion both have shapes in which the recess portions which are recessed to approach the inner edge side of the rear wall end edge portion are disposed as compared with the to-be-coupled upper edge adjacent portion and lower edge adjacent portion of the rear edge in the rear edge side portion of the protruding side lateral wall portion, and are shaped such that the width dimensions of the rear wall end edge portion in the left-right direction are narrowed. When the airbag is inflated, without reducing an amount of protruding in a vicinity of the top portion protruding rearward of the protruding portion, the recess portions that narrow the width dimension of the rear wall end edge portion have an effect of pulling the protruding portion itself toward the inner edge side, that is, toward the front collision restraining surface side. Therefore, the behavior of the protruding portion away from the rear wall main portion side is prevented, and as a result, the increase in the width dimension of the airbag is further prevented.

The protruding side lateral wall portion of the airbag may be disposed with an outer peripheral edge thereof being coupled to only the lower wall portion, the upper wall portion, and the separation edge of the rear wall end edge portion.

In such a configuration, the protruding side lateral wall portion which is a side wall portion of the airbag on a side where the oblique collision constraining portion is provided are disposed with the outer peripheral edge thereof being coupled to only the lower wall portion, the upper wall portion, and the rear wall end edge portion, when being coupled to the outer peripheral edge of the protruding side lateral wall portion, only portions on three positions of the lower wall portion, the upper wall portion, and the rear wall end edge portion serving as to-be-coupled members, are coupled. Since it is sufficient to prepare as above, there is no need to prepare in advance to connect many, four or more parts to each other as in the related art, and the coupling operation can be easily performed.

The upper wall portion and the lower wall portion of the airbag may be formed from one sheet-shaped bag base fabric for forming the upper and lower wall portions whose front edges are connected.

Therefore, in such a configuration, the coupling operation between the lower wall portion and the upper wall portion can be omitted, so that the coupling operation of the outer peripheral edge of the side wall portion on the side where the oblique collision restraining portion is disposed in the airbag can be performed easily.

The invention claimed is:

1. A passenger seat airbag device comprising:
 an airbag which is folded and stored at a storage portion disposed in an instrument panel on a front side of an occupant seated in a passenger seat, and which is deployed and inflated to be able to protect the occupant by protruding from the storage portion to a vehicle rear side when an inflation gas flows in,
 the airbag including:
  as an outer peripheral wall when the inflation is completed, a rear wall portion on a rear portion side; an upper wall portion extending forward from an upper edge side of the rear wall portion; a lower wall portion which extends forward from a lower edge side of the rear wall portion, and in which a vicinity of a center in a left-right direction on a front portion side thereof is set as an attachment portion for attaching the airbag to the storage portion while allowing the inflation gas to flow inside; and a left wall portion and a right wall portion which extend forward respectively from left and right edges of the rear wall portion and whose upper and lower edges are connected to the upper wall portion and the lower wall portion, and the airbag further including, on a rear wall portion side when the inflation is completed:
   a front collision restraining surface configured to receive a head of the occupant that moves forward in a front collision of a vehicle; and
   an oblique collision restraining portion configured to receive the head of the occupant that moves obliquely forward in an oblique collision or offset collision of the vehicle, and the oblique collision restraining portion including:
   a protruding portion which protrudes rearward from a left-right direction edge side of the front collision restraining surface, and in which a surface on a front collision restraining surface side is set as an oblique collision restraining surface configured to receive the head of the occupant that moves obliquely forward; and
   a restraining recess portion which is disposed on the front collision restraining surface side of the protruding portion, which extends forward from adjacent edges of the oblique collision restraining surface and the front collision restraining surface, and whose facing surfaces are able to restrain the head of the occupant, wherein the rear wall portion of the airbag includes a rear wall main portion and a rear wall end edge portion on the oblique collision restraining portion side, which are separated to the left and right with the restraining recess portion interposed therebetween, the rear wall main portion has a configuration in which the front collision restraining surface is disposed, the rear wall end edge portion has a configuration in which the oblique collision restraining surface is disposed, a surface of the protruding portion of the airbag which is on an opposite side of the oblique collision restraining surface is formed from a rear edge side portion in a protruding side lateral wall portion constituting the left wall portion or the right wall portion on a side where the protruding portion is disposed, the oblique collision restraining surface is formed from the rear wall end edge portion, the restraining recess portion of the airbag is formed by connecting a peripheral edge of an end edge-side extending portion extending forward from an inner edge of the rear wall end edge portion on a rear wall main portion side, and a peripheral edge of a main portion-side extending portion extending forward from an edge of the rear wall main portion on a rear wall end edge portion side, the rear wall end edge portion is formed from a sheet-shaped bag base fabric for forming the rear wall end edge portion, and the bag base fabric has an outer peripheral edge including: an upper edge on an upper wall portion side; a lower edge on a lower wall portion side; a separation edge which is an edge on a side away from the front collision restraining surface between the upper edge and the lower edge, and which is shaped to bulge away from an edge on the front collision restraining surface side; and an inner edge on the front collision restraining surface side between the upper edge and the lower edge, the upper edge of the rear wall end edge portion is continuous with an upper edge of the rear wall main portion in the left-right direction, and is coupled to a rear edge of the upper wall portion, the lower edge of the rear wall end edge portion is continuous with a lower edge of the rear wall main portion in the left-right direction, and is coupled to a rear edge of the lower wall portion, an entire edge of the separation edge of the rear wall end edge portion is coupled to a rear edge of the rear edge side portion of the protruding side lateral wall portion, and the inner edge of the rear wall end edge portion includes a middle portion which is an edge portion of the end edge-side extending portion to be coupled to the main portion-side extending portion, and upper and lower portions of the middle portion are coupled to corresponding edge portions of the rear wall main portion on the rear wall end edge portion side such that the rear wall end edge portion and the rear wall main portion are continuous in the left-right direction.

2. The passenger seat airbag device according to claim 1, wherein
the left wall portion and the right wall portion of the airbag when the inflation is completed are connected to each other by a lateral tether configured to regulate a distance between the left wall portion and the right wall portion.

3. The passenger seat airbag device according to claim 1, wherein
the rear edge, which is coupled to the separation edge, of the rear edge side portion in the protruding side lateral wall portion of the airbag includes:
   an upper edge adjacent portion extending from an upper edge on an upper wall portion side;
   a projection-shaped edge portion which has a projection shape and extends from the upper edge adjacent portion passing a vicinity of a top portion in the protruding portion which bulges away from the front collision restraining surface; and
   a lower edge adjacent portion which extends from the projection-shaped edge portion and is continuous with the lower edge on the lower wall portion side, the separation edge of the rear wall end edge portion in the airbag includes:
   an upper edge coupled to the upper edge adjacent portion of the rear edge in the rear edge side portion of the protruding side lateral wall portion;
   a lower edge coupled to the lower edge adjacent portion of the rear edge in the rear edge side portion of the protruding side lateral wall portion; and
   a middle edge coupled to the projection-shaped edge portion of the rear edge in the rear edge side portion of the protruding side lateral wall portion; and the upper edge and the lower edge both have shapes in which recess portions which are recessed so as to approach the inner edge side are disposed as compared with outer shapes of the to-be-coupled upper edge adjacent portion and lower edge adjacent portion.

4. The passenger seat airbag device according to claim 1, wherein
    the protruding side lateral wall portion of the airbag is disposed with an outer peripheral edge thereof being coupled to only the lower wall portion, the upper wall portion, and the separation edge of the rear wall end edge portion.

5. The passenger seat airbag device according to claim 4, wherein
    the upper wall portion and the lower wall portion of the airbag are formed from one sheet-shaped hag base fabric for forming the upper and lower wall portions whose front edges are connected.

\* \* \* \* \*